(12) United States Patent
Wang et al.

(10) Patent No.: US 12,549,983 B2
(45) Date of Patent: Feb. 10, 2026

(54) METHOD FOR REPORTING AND CONFIGURING MDT MEASUREMENT, APPARATUS AND ELECTRONIC DEVICE USING THE SAME AND MEDIUM

(71) Applicant: Samsung Electronics Co., Ltd., Suwon-si (KR)

(72) Inventors: Hong Wang, Beijing (CN); Lixiang Xu, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 17/775,451

(22) PCT Filed: Sep. 25, 2020

(86) PCT No.: PCT/KR2020/013120
§ 371 (c)(1),
(2) Date: May 9, 2022

(87) PCT Pub. No.: WO2021/091083
PCT Pub. Date: May 14, 2021

(65) Prior Publication Data
US 2022/0386160 A1     Dec. 1, 2022

(30) Foreign Application Priority Data

Nov. 7, 2019   (CN) .......................... 201911083183.7
Nov. 14, 2019  (CN) .......................... 201911115163.3

(51) Int. Cl.
*H04W 24/10*   (2009.01)
(52) U.S. Cl.
CPC .................................. *H04W 24/10* (2013.01)
(58) Field of Classification Search
None
See application file for complete search history.

(56) References Cited

U.S. PATENT DOCUMENTS

2013/0065612 A1   3/2013   Siomina et al.
2013/0114446 A1*  5/2013   Liu ...................... H04W 24/10
                                                      370/252
(Continued)

FOREIGN PATENT DOCUMENTS

CN           103125133 A      5/2013

OTHER PUBLICATIONS

Huawei; (TP for MDT BL CR for TS 38.401): MDT data reporting in split RAN; 3GPP TSG-RAN3 Meeting #105bis; R3-195554; Oct. 5, 2019, Chongqing, China.
(Continued)

*Primary Examiner* — Yaotang Wang
(74) *Attorney, Agent, or Firm* — Jefferson IP Law, LLP

(57) ABSTRACT

The embodiment of the present disclosure provides a method for reporting and configuring MDT measurement, apparatus and electronic device using the same and medium. The method may be performed by a first access network node and includes: obtaining first MDT configuration information; performing MDT measurement according to the first MDT configuration information to obtain a first MDT measurement report; transmitting the first MDT measurement report to a first node, so that the first node combines a second MDT measurement report associated with the first MDT measurement report obtained by the first node with the first MDT measurement report; and/or receiving a third MDT measurement report transmitted by a second access network node, combining the third MDT measurement report and the first MDT measurement report, and transmitting the combined measurement report to a second node. The solution provided in the embodiment of the present disclosure provides an implementation method of reporting MDT measurement when performing MDT measurement at multiple nodes.

22 Claims, 10 Drawing Sheets

(56) References Cited

U.S. PATENT DOCUMENTS

| | | | |
|---|---|---|---|
| 2013/0178211 A1 | 7/2013 | Wang et al. | |
| 2014/0248868 A1* | 9/2014 | Wang | H04W 24/10 |
| | | | 455/422.1 |
| 2016/0037371 A1 | 2/2016 | Racz et al. | |
| 2020/0351693 A1* | 11/2020 | Jung | H04W 24/08 |
| 2021/0377753 A1* | 12/2021 | Li | H04W 24/02 |

OTHER PUBLICATIONS

Samsung; Discussion for management based MDT in split RAN; 3GPP TSG-RAN WG3 #105bis; R3-195012; Oct. 4, 2019, Chongqing, China.
3GPP TR 37.816 V16.0.0; 3rd Generation Partnership Project; Technical Specification Radio Access Network; Study on RAN-centric data collection and utilization for LTE and NR (Release 16), Jul. 23, 2019.
Huawei; (TP for MDT BL CR for TS 38.423):MDT in MR-DC; 3GPP TSG-RAN3 Meeting #105bis; R3-195557; Oct. 5, 2019, Chongqing, China.
Chinese Office Action dated Aug. 19, 2025, issued in Chinese Patent Application No. 201911115163.3.
Huawei, (TP for MDT BL CR for TS 38.473): MDT data reporting in split RAN, R3-195555, 3GPP TSG-RAN3 Meeting #105bis, Oct. 5, 2019.
Chinese Office Action dated Sep. 2, 2024, issued in Chinese Patent Application No. 201911115163.3.
Chinese Office Action dated Mar. 26, 2025, issued in Chinese Patent Application No. 201911115163.3.
Chinese Office Action dated Nov. 7, 2025, issued in Chinese Patent Application No. 201911115163.3.

* cited by examiner

METHOD FOR REPORTING AND CONFIGURING MDT MEASUREMENT, APPARATUS AND ELECTRONIC DEVICE USING THE SAME AND MEDIUM

CROSS-REFERENCE TO RELATED APPLICATION(S)

This application is a U.S. National Stage application under 35 U.S.C. § 371 of an International application number PCT/KR2020/013120, filed on Sep. 25, 2020, which is based on and claimed priority of a Chinese patent application number 201911083183.7, filed on Nov. 7, 2019, in the Chinese Intellectual Property Office, and of a Chinese patent application number 201911115163.3, filed on Nov. 14, 2019, in the Chinese Intellectual Property Office, the disclosure of each of which is incorporated by reference herein in its entirety.

TECHNICAL FIELD

The present disclosure relates to the field of communication technology, and particularly, relates to methods for reporting and configuring minimization of drive tests (MDT) measurement, an apparatus, an electronic device using the method, and a medium.

BACKGROUND ART 5G (5th-Generation) refers to a fifth-generation mobile communication technology, which is not a single wireless technology, but a converging of existing wireless communication technologies. Currently, the peak rate of LTE can reach 100 Mbps, and the peak rate of 5G will reach 10 Gbps, which is 100 times greater than 4G. The existing 4G network has limited processing capacity and cannot support some high-definition video, high-quality voice, augmented reality, and virtual reality and so on. 5G will introduce more advanced technologies, meet requirements of mobile traffic growth, solve problems faced by 4G network, and build a network community with high transmission rate, high capacity, low delay, high reliability and excellent user experience through higher spectrum efficiency, more spectrum resources and denser cells.

As shown in FIG. 1, the 5G architecture includes a 5G access network and a 5G core network (5GC). The UE communicates with the data network through the access network and the core network. As shown in the figure, in the 5G architecture, with the development of wireless technology, function modules that were originally on the same base station are separated, some function modules are getting closer to users, and other modules are pooled, virtualized, and centrally deployed. That is to say, the base station may be divided into two parts, one is a central control unit, which may also be referred to as central unit (CU), and the other is a distribution unit (DU). The DU is closer to the user, the CU is far away from the antenna, and they can support multi-antenna connection and improve the network performance, one CU can connect multiple DUs, and the functions on the CU may be virtualized. The CU and the DU are connected through an F1 interface. The F1 interface is also called as a fronthaul interface or a fronthaul connection. The functions of radio resource control (RRC) and packet data convergence protocol (PDCP) are implemented on CU, and the functions of radio link control (RLC), medium access control (MAC) and physical layer are implemented on DU.

As shown in FIG. 1, the CU may be further divided into a control plane function entity (hereinafter referred to as CU-CP entity or CP entity) and a user plane function entity (hereinafter referred to as CU-UP entity or UP entity). The CP entity and the UP entity may be separated physical entities, and the interface between the CP and the UP is called an E1 interface. When there is only a control plane between the CP and the UP, the data plane is established between the core network, the UP, and the DU. The CP is connected to the core network through the NG-C interface, and is connected to the DU through the F1-C interface. The UP is connected to the core network through the NG-U interface, and is connected to the DU through the F1-U interface.

MDT allows the base station or user (i.e., user equipment (UE)) to perform some measurements and transmit the measurement results to a measurement center node, such as a Tracking collection entity (TCE) node, to reduce the burden of manual testing. MDT measurement supports real-time and non-real-time measurements. The core network or the operation and maintenance node (also referred as element management (EM)) transmits an MDT activation message to the access network node, and the message carries the specific MDT measurement configuration, such as measurement type, measurement period, measurement threshold, reporting period or reporting threshold. Some MDT measurement types require the UE to perform measurements. For these measurement types, the access network node transmits an RRC message to the UE, configures the UE to perform MDT measurement, and the UE reports the measurement results to the access network node. Some MD measurement types require base stations to perform measurements. For these measurement types, the base stations perform MDT measurements based on specific configuration information. The access network node transmits the measurement results (including the measurement results measured by the UE and the measurement results measured by the base station) to the measurement center node.

According to the mode for initiating of MDT, MDT may be divided into management-based MDT and signaling-based MDT. Management-based MDT means that the access network entity receives an MDT activation message from the operation and maintenance node. Signaling-based MDT means that the access network entity receives an MDT activation message from a core network entity (such as a mobility management entity).

FIG. 2 depicts a structural diagram of a management-based MDT. The reference number 201 is an operation and maintenance node. The operation and maintenance node 201 transmits an MDT activation request message to the access network node 202. The access network node 202 may be an eNB of a 4G system or a gNB or eNB of a 5G system or a base station in another system. The MDT activation request message includes MDT configuration information. MDT configuration information mainly includes: MDT location selection conditions, reporting mechanism configuration, tracking reference (TR), IP address of MDT measurement center node (such as TCE), work type, and whether the MDT data is anonymous. The above types of work may be configured as different types. For example, four types are currently defined: immediate MDT only, logged MDT only, tracking only, and immediate MDT and tracking. It does not exclude the definition of more types or simplified types. The MDT location selection condition is used to configure which UEs may be selected as users of MDT measurement. The location selection condition may be configured as a cell range, or a tracking area code (TAC) range, or the entire public land mobile network (PLMN). UEs within the range may be selected as UEs for MDT. TR uniquely identifies an MDT process. In one MDT process, the base station may select multiple users for MDT measurement.

The access network node 202 selects the UE 203 for MDT measurement. When the access network node selects the UE, certain conditions may be followed, such as whether the user agrees to perform the measurement and/or whether the UE is located in the MDT position in the MDT configuration information. If the UE does not agree with the MDT, or the UE does not meet the location selection conditions, the UE cannot be selected as the UE for the MDT. After selecting the UE, if the UE needs to perform measurement, the access network node transmits the MDT configuration information to the UE. The UE performs MDT measurement according to the configuration, and when the reporting conditions are met, the measurement result is transmitted to the access network node 202. The access network node 202 transmits an MDT tracking message to the core network entity, i.e., the core network node 205. The core network entity may be a 4G mobility management entity (MME), 5G access and mobility management function (AMF), or a core network entity connected to the access network in other systems. The MDT tracking message includes at least the identifier of the MDT and the IP address of the TCE. The core network node 205 finds the unique identifier of the UE, such as international mobile subscriber identity (IMSI), international mobile equipment identity (IMEI), or international mobile equipment identity software version (IMEISV), transmits the unique identifier to TCE. The access network node 202 saves the MDT measurement results, also referred to as MDT records, and based on a predefined policy, the access network node 202 transmits the MDT records to the measurement center node (MDT central node 204 shown in the figure), such as TCE, and TCE may know for which UE the MDT records through combining with the information transmitted by the core network entity.

In contrast, the signaling-based MDT is that the MDT start message and the MDT activation message are transmitted from the core network entity to the access network entity, and the MDT configuration information is allocated by the core network entity.

With the development of wireless technology, when the access network is multiple entities, for example, the access network includes DU, CU-UP, and CU-CP, the MDT measurement for a UE bearer means that multiple entities perform a certain type of MDT measurement. In this case, a problem to be studied is how the multiple entities report, and in another case, when a UE is configured as a dual connection, and the MDT measurements are performed on both nodes of the dual connection, a problem to be studied is how the primary node (i.e., the primary base station) and the secondary node (i.e., the secondary base station) perform the MDT measurement report.

DISCLOSURE OF INVENTION

Technical Problem

The purpose of this application is to solve at least one of above disadvantages. The solutions provided in the embodiments of the present disclosure are as follows.

Solution to Problem

In a first aspect, an embodiment of the present disclosure provides a method for reporting MDT measurement. The method is performed by a first access network node and may include: obtaining first MDT configuration information; performing MDT measurement according to the first MDT configuration information to obtain a first MDT measurement report; transmitting the first MDT measurement report to a first node, so that the first node combines a second MDT measurement report associated with the first MDT measurement report obtained by the first node with the first MDT measurement report; and/or receiving a third MDT measurement report transmitted by a second access network node, combining the third MDT measurement report and the first MDT measurement report, and transmitting the combined measurement report to a second node.

In a second aspect, an embodiment of the present disclosure provides a method for reporting MDT measurement. The method may include: receiving a first MDT measurement report transmitted by a first access network node and a second MDT measurement report transmitted by a second access network node; combining the first MDT measurement report and the second MDT measurement report.

In a third aspect, an embodiment of the present disclosure provides a method for configuring MDT measurement. The method is performed by a first access network node, and the method includes: obtaining information indicating whether the user equipment (UE) allows to perform MDT measurement; receiving MDT configuration information; selecting the UE for performing the MDT measurement based on the information indicating whether the UE allows to perform MDT measurement and the MDT configuration information; transmitting a cell data tracking message to a second access network node so that the second access network node is triggered to transmit a data tracking request message to the core network node; wherein the first access network node is any one of the followings: the secondary base station, the central unit (CU) of the secondary base station, and the control plane of the central unit (CU-CP) of the secondary base station; wherein the second access network node is any one of the followings: the primary base station, the CU of the primary base station, and the CU-CP of the primary base station.

In a fourth aspect, an embodiment of the present disclosure provides a device for reporting MDT measurements, and the device may include: a configuration information receiving unit, configured to obtain first MDT configuration information; a measurement report generating unit, configured to perform MDT measurement according to the first MDT configuration information to obtain a first MDT measurement report; a measurement report processing unit, configured to transmit the first MDT measurement report to a first node, so that the first node combines a second MDT measurement report associated with the first MDT measurement report obtained by the first node with the first MDT measurement report; and/or receive a third MDT measurement report associated with the first MDT measurement report transmitted by a second access network node, combine the third MDT measurement report and the first MDT measurement report, and transmit the combined measurement report to a second node.

In a fifth aspect, an embodiment of the present disclosure provides a device for reporting MDT measurements, and the device may include: a measurement report receiving unit, configured to receive a first MDT measurement report transmitted by a first access network node and a second MDT measurement report transmitted by a second access network node; a measurement report combining unit, configured to combine the first MDT measurement report and the second MDT measurement report.

In a sixth aspect, an embodiment of the present disclosure provides a configuration device for MDT measurements, which is included in a first access network node, and the device may include: a UE information receiving unit, configured to obtain information indicating whether a user equipment (UE) allows to perform MDT measurement; a configuration information receiving unit, configured to obtain MDT configuration information; an information processing unit, configured to select the UE for performing the MDT measurement based on the information indicating whether the UE allows to perform MDT measurement and the MDT configuration information; and transmit a cell data tracking message to a second access network node so that the second access network node is triggered to transmit a data tracking request message to the core network node; wherein the first access network node is any one of the followings: the secondary base station, the central unit (CU) of the secondary base station, and the control plane of the central unit (CU-CP) of the secondary base station; wherein the second access network node is any one of the followings: the primary base station, the CU of the primary base station, and the CU-CP of the primary base station.

In a seventh aspect, an embodiment of the present disclosure provides an electronic device. The electronic device includes a processor and a memory, wherein the memory stores a computer program, and the processor is configured to execute the computer program stored in the memory to implement the method according to any one of embodiments of the disclosure.

In an eighth aspect, an embodiment of the present disclosure provides a computer-readable storage medium storing computer programs that, when executed by the processor, implement the method of any one of embodiments of the present disclosure.

The beneficial effects of the technical solutions provided in the embodiments of the present disclosure will be described in the following detailed description, and will not be described herein.

BRIEF DESCRIPTION OF DRAWINGS

The accompanying drawings, which are used in the description of the embodiments of the present disclosure, are briefly described below in order to more clearly illustrate the technical solutions in the embodiments of the present disclosure.

MODE FOR THE INVENTION

Figure 1:
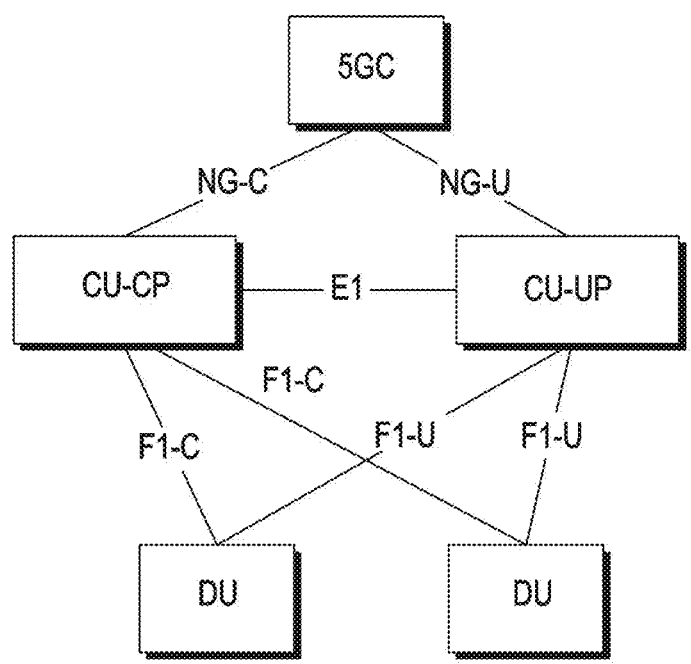
FIG. 1 illustrates an architecture diagram of an existing 5G system.
Figure 2:
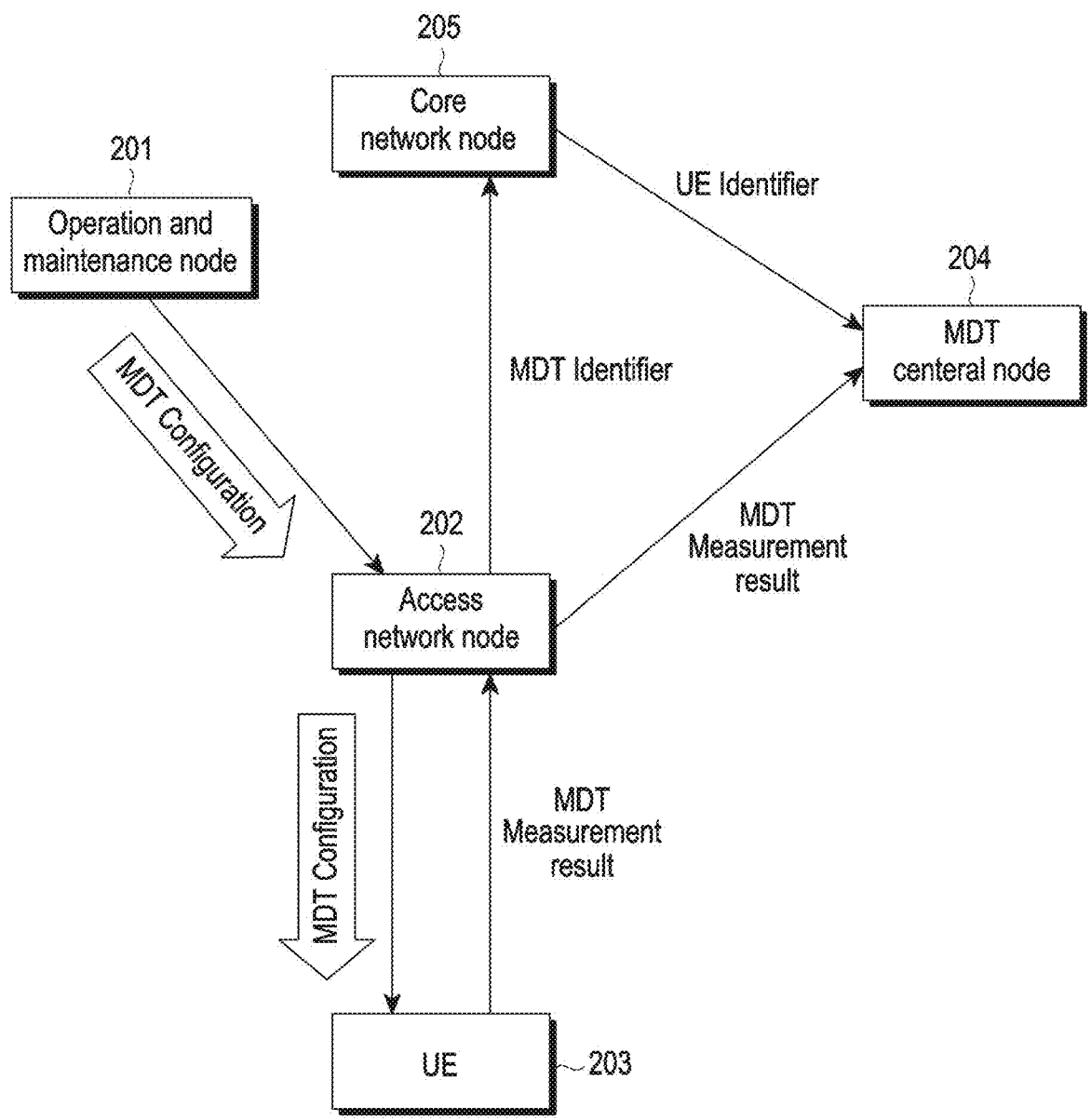
FIG. 2 illustrates a schematic structural diagram of an existing MDT measurement.

The embodiments of the present disclosure are described in detail below, and the examples of the embodiments are illustrated in the drawings, wherein throughout the drawings, the same or similar reference numbers are used to depict the same or similar elements or elements having the same or similar functions. The embodiments described below with reference to the accompanying drawings are illustrative, and are only used to explain the present disclosure, rather than being construed as limiting the present disclosure.

Those skilled in the art should understand that the singular forms "a", "an", "said" and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

It should be noted that the description in the following embodiments is only for illustration, and is not intended to limit the present disclosure. In the following description, in order to provide a thorough understanding of the present disclosure, numerous specific details are set forth. However, it is obvious to one of ordinary skill in the art that these specific details should not be used to implement the application. In the description of some embodiments, in order to avoid obscuring the application, there may not be too many descriptions of well-known solutions or steps that may be included in the implementation of the application, but these should be clear to those skilled in the art.

In the description of the embodiments of the present disclosure, a reference to "one embodiment", "an embodiment", "an example", or "example" means that a particular feature, structure, or characteristic described in connection with the embodiment or example is contained in at least one embodiment of the present disclosure. Thus, the appearances of the phrases "in one embodiment", "in an embodiment", "an example", or "example" in various places in the description are not necessarily referring to the same embodiment or example. Furthermore, the specific features, structures, or characteristics may be combined in any suitable combination and/or sub-combination in one or more embodiments or examples. In addition, those of ordinary skill in the art should understand that the drawings provided herein are for the purpose of illustration, and the drawings are not necessarily drawn in scale. The term "and/or" as used herein includes any and all combinations of one or more of the associated listed items.

In order to make the purpose, technical solution, and advantages of the present disclosure clearer, the technical solution of the present disclosure and how the technical solution of the present disclosure solves the foregoing technical problems will be described in detail with specific embodiments in conjunction with the accompanying drawings. The following specific embodiments may be combined with each other, and the same or similar concepts or processes may not be repeated in some embodiments. The embodiments of the present disclosure will be described below with reference to the drawings.

Figure 3:
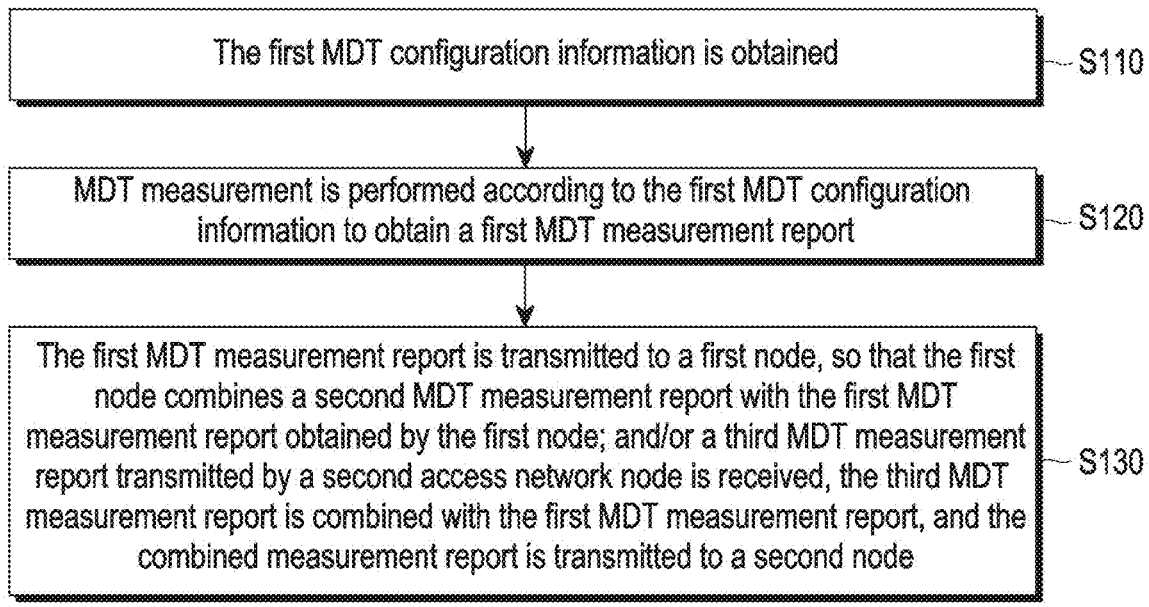
FIG. 3 illustrates a schematic flowchart of a method for reporting MDT measurement according to an embodiment of the present disclosure.

FIG. 3 illustrates a schematic flowchart of a method for reporting an MDT measurement according to an embodiment of the present disclosure. The method may be specifically performed by a first access network node. As shown in the figure, the method may include steps S110 to S130.

Step S110: a first MDT configuration information is obtained.

Step S120: MDT measurement is performed according to the first MDT configuration information to obtain a first MDT measurement report.

Step S130: the first MDT measurement report is transmitted to a first node, so that the first node combines a second MDT measurement report with the first MDT measurement report obtained by the first node; and/or a third MDT measurement report transmitted by a second access network node is received, the third MDT measurement report is combined with the first MDT measurement report, and the combined measurement report is transmitted to a second node.

It should be noted that, for different application scenarios, the first node and the second node may be the same node in a radio access network (RAN), or they may be different nodes. The second MDT measurement report and the third MDT measurement report may be the same measurement report, or they may be different measurement reports.

The reporting solution provided in the embodiment of the present disclosure provides a feasible reporting method in a scenario where multiple access network nodes are needed to complete MDT together. Based on this solution, one access network node may combine the measurement reports obtained by each of access nodes performing the MDT measurement, and transmit the combined measurement report to the destination node (such as a measurement center node, an operation and maintenance node), or each of access network nodes may respectively transmit its own measurement report to the destination node, and the destination node combines the received measurement reports. The embodiment of the present disclosure provides a new MDT reporting mechanism, which solves the problem of how to perform reporting when multiple network entities jointly perform MDT measurement in the prior art.

It is clear to a person skilled in the art that the multiple MDT measurement reports that may be combined in the embodiments of the present disclosure are associated measurement reports, such as a certain type of MDT measurements for the same UE, or a measurement report of higher layer portion and a measurement report of lower layer portion of the same MDT measurement. The association relationship between multiple MDT measurement reports that may be combined may be specifically reflected according to the specific content contained in the measurement reports. The association relationship may be configured by the system according to the actual application scenario or according to provisions of protocol. For example, two measurement reports being associated with each other may refer that two measurements reports include the same identifier of MDT measurements. The identifier of the MDT measurement may include but is not limited to TR and/or TRSR. If the two measurement reports contain the same TR and/or TRSR, it indicates that the two measurement reports are measured for the same MDT, the two measurement reports may be considered to as being associated with each other. Of course, the system may also specify or configure which related information needs to be carried in the associated measurement report, so that the node that receives multiple measurement reports may determine whether to combine the reports and how to combine the reports based on the information.

In addition, in step S130, the first access network node transmits the first MDT measurement report to the first node, so that the first node combines the obtained second MDT measurement report with the obtained first MDT measurement report, and the third MDT measurement report transmitted by the second access network node is received, the third MDT measurement report is combined with the first MDT measurement report, and the combined measurement report is transmitted to the second node. That is, the combination of measurement reports may be performed at two nodes at the same time. At this time, the first access network node may transmit a part or all of the measured MDT measurement reports to the first node according to the system configuration. The received third MDT measurement report transmitted by the second access network node may also be a part or all of the MDT measurement reports measured by the second access network node. The first node or the first access network node may combine a part (e.g., the received part or a part of the whole received) or all of the received measurement reports according to the configuration. For example, the first access network node is a main node (MN) or a primary base station, the first node and the second access network node are a secondary node (SN) or a secondary base station, and both the MN and the SN perform a certain MDT measurement, the MN transmits a part of the measurement results to the SN according to the configuration. The SN combines the part of the measurement results measured by itself with the part of the measurement results received from the MN, and the SN transmits the other part of the measurement results measured by itself to the MN, and the MN combines the other part of the measurement result measured by itself with the other part of the measurement results received from the SN.

The first access network node and the second access network node may be access network nodes in the radio access network (RAN) under a separation architecture, or they may be access network nodes under a dual connectivity architecture.

Specifically, in an optional embodiment of the present disclosure, the first access network node is any one of the followings: a primary base station, a secondary base station, a central unit (CU) of base station, a distribute unit (DU) of base station, a control plane of CU (CU-CP), a user plane of CU (CU-UP).

The first node is any one of the followings: a measurement center node, an operation and maintenance node, the primary base station, the secondary base station, CU, DU, CU-CP, CU-UP.

The second access network node is any one of the followings: the primary base station, the secondary base station, CU, DU, CU-CP, CU-UP.

The second node is the measurement center node or the operation and maintenance node.

In the embodiment of the present disclosure, the measurement center node and the measurement maintenance node refer to a destination node to which the MDT measurement report is to be transmitted. For example, the measurement center node may be TCE, and the measurement maintenance node may be EM. It may be understood that the measurement center node and the measurement maintenance node may also be other nodes, such as a final destination node of other measurement reports configured by the system. MN and SN may be either base stations under the same RAN system or base stations under different RAN systems. For example, MN may be a 4G base station, SN may be a 5G base station, or MN may be a 5G base station, or SN may be a 4G base station, or both MN and SN are 5G base stations or 4G base stations.

It should be noted that, for the MN and the SN, the base station may be a base station of a separation architecture or may not be a base station of a separation architecture. For example, both may be base stations of a non-separation architecture, or both are base stations of a separation architecture, or one is a base station of a separation architecture, and the other is not a base station of a separation architecture. For example, the MN may be a base station of a separation architecture including DU and CU (or CU-CP and CU-UP), and the SN may be a base station of a non-separation architecture. In addition, when the MN or SN is a base station of a separation architecture, the access network nodes involved in the embodiments of the present disclosure may be respective access network nodes for MN or SN, and particularly, may be a part of the entity structure contained in MN or SN, such as DU, CU, CU-CP or CU-UP in MN or SN.

For convenience of description, in the following description of the embodiment of the present disclosure, the description will be made by taking TCE as a measurement center node and EM as a measurement maintenance node as an example.

As an example, the first access network node may be an MN in a dual connectivity architecture, the second access network node may be an SN, and the first node may be a TCE. Based on the solution of steps S110 to S130 provided in the embodiment of the present disclosure, the MN may obtain the MDT configuration information from the EM (management-based MDT) or the core network node (signaling-based MDT). For MDT measurements that require both MN and SN to participate, the MN measures its own part according to the configuration and transmits the measurement report to the TCE. The MN may transmit the received MDT configuration information (either the configuration information received by the MN or the configuration information adjusted by the MN) to the SN, and the SN measures its own part based on the received configuration information and transmits the measurement report to TCE, and TCE combines the two measurement reports received from MN and SN. The advantage of performing combination by TCE is that it can reduce the data interaction between various nodes in the RAN.

As another example, it is assumed that the first node is a CU, the second node is a DU, and the second node is a TCE. Based on the solution of steps S110, S120, and S140 provided in the embodiment of the present disclosure, the CU may obtain the MDT configuration information from an EM or a core network node. For MDT measurements that require both the CU and the DU to participate, the CU measures its own part according to the configuration to obtain a measurement report. The CU may transmit the received MDT configuration information (either the configuration information received by the CU or the configuration information adjusted by the CU) to the DU. The DU measures its own part according to the received configuration information and transmits the measurement report to the CU. The CU combines the measurement report transmitted by the DU with the measurement report measured by itself and transmits the combined measurement report to TCE. For the method of performing combination by RAN nodes, the advantage is that a complete MDT measurement report is formed by one of the RAN nodes and transmitted to TCE, which reduces the impact on the core network. For TCE, TCE does not know whether the RANs are separated, whether the MN and SN are provided. Therefore, the operation of TCE does not depend on the architecture of the RAN.

In an optional embodiment of the present disclosure, when the first node is a primary base station, a secondary base station, a CU, a DU, a CU-CP, or a CU-UP, the first node combines the second MDT measurement report and the first MDT measurement report, and then the method further includes that the first node transmits the combined measurement report to the second node.

That is, when the combination of measurement reports is completed in the RAN node, the RAN node that completes the combination also needs to transmit the combined complete measurement report to the MDT destination node, such as the measurement center node or the operation and maintenance node.

In an optional embodiment of the present disclosure, the second MDT measurement report is obtained by the second access network node in the following manner obtaining the second MDT configuration information, and performing MDT measurement according to the second MDT configuration information to obtain a second MDT measurement report.

The MDT configuration information obtained by the second access network node may be received from another access network node (which may be the first access network node or another access network node), or may be received by the second access network node from a measurement center node or a core network node.

In an optional embodiment of the present disclosure, the obtaining the first MDT configuration information includes any one of the following: receiving the first MDT configuration information transmitted by the operation and maintenance node; receiving first MDT configuration information transmitted by a core network node; and receiving first MDT configuration information transmitted by a third access network node.

The core network node may be an MME in an LTE system, or an AMF in a 5G system, or a core network entity in another system. For different RAT systems, the names of the core network nodes may be different. In different application scenarios, the second access network node and the third access network node may be the same access network node, or they may not be the same access network node.

In an optional embodiment of the present disclosure, if the first MDT configuration information is received from an operation and maintenance node or a core network node, the method may further include transmitting the third MDT configuration information to the fourth access network node.

That is, the MDT configuration information obtained by the first access network node may be received from the measurement center node or the core network node, or it may be received from other access network nodes. For the MDT configuration information being received from the measurement center node or the core network node, when the MDT measurement requires to be performed simultaneously by multiple access network nodes, the first access network node needs to complete its own measurement part based on the received configuration information, and further needs to transmit the configuration information to other access network nodes that need to perform MDT measurement, so that other access network nodes may perform their own MDT measurement according to the received configuration information. For different application scenarios, the fourth access network node and the second access network node may be the same access network node, or they may be different access network nodes.

It may be known from the foregoing description that when the first access network node transmits the configuration information to other access network nodes, the configuration information received by the first access network node may be directly transmitted to other access network nodes, or the configuration information is modified and then transmitted to other access network nodes. Which manner is adopted may be determined according to system provisions or preconfigured rules. For example, different determining methods may be adopted according to the types of MDT measurement.

As an example, assuming that the first access network node is an MN and the second access network node is an SN, if a certain type of MDT measurement requires both the MN and the SN to participate in the measurement, the MN may directly transmit the configuration information to the SN, or modify the configuration information according to the protocol and transmit the modified configuration information to the SN, after obtaining the configuration information. For example, the measurement name in the configuration information received by the MN is D1 (a measurement type identifier), and the measurement name in the configuration information transmitted by the MN to the SN is D1-1.

In an optional embodiment of the present disclosure, the first MDT measurement report, the second MDT measurement report, or the third MDT measurement report includes at least one of the following information: identifier of MDT measurements; MDT measurement type indication information; type indication information of a node for performing the MDT measurement; bearer type indication information; measurement level indication information; identification indication information of data radio bearer (DRB); MDT measurement results.

It may be understood that the information contained in the MDT measurement report may be different for different system architectures. For different types of MDT measurement, the information contained in the MDT measurement report may also be different. The information contained in each measurement report may be specified by the system or protocol.

For the solution provided in the embodiment of the present disclosure, since MDT measurement may be performed by multiple nodes, in order to enable an access network node, a measurement center node, or an operation and maintenance node to combine multiple MDT measurement reports, MDT measurement reports to be combined should contain sufficient information so that the nodes for performing combination may combine the measurement results of multiple nodes based on the information in the received MDT measurement reports to obtain a complete measurement result.

In an optional embodiment of the present disclosure, the DRB identification indication information includes at least one of the following: DRB identifier, at least one Qos flow identifier (QFI) mapped to DRB, and quality of service flow (QoS) parameter information (such as 5G QoS identifier (5QI)) corresponding to at least one Qos flow (QF) mapped to DRB.

It should be noted that the above indication information that may be contained in the MDT measurement report may be implicit indication information or explicit indication information, and the information may be specified by the system or protocol. In order to better understand the above information, each information is described below.

1. The identifier of MDT measurement, such as tracking reference (TR), and/or tracking recording session reference (TRSR). This identifier is a unique identifier for the entire network, which may include an identifier of PLMN and an ID, and uniquely identifies an MDT measurement of the MDT.

2. MDT measurement type indication information, such as the name of the MDT measurement. This indication information indicates which type of MDT the MDT measurement report is directed to. For example, the name of the MDT measurement is M4, and M4 represents data volume measurement (such as Data Volume measurement separately for DL and UL); the name of the MDT measurement is M5, M5 represents throughput measurement (such as Scheduled IP Throughput for MDT measurement separately for DL and UL); the name of the MDT measurement is M6, M6 represents data delay measurement (such as Packet Delay measurement separately for DL and UL).

3. Node type indication information. The indication information indicates the type of the RAN node measuring the MDT. The indication information may be explicit indication information, such as the RAN node being set as one of a primary base station, a secondary base station, DU, CU, CU-UP, CU-CP. The indication information may also be implicit indication information. For example, the system specifies that different node types are represented by different identifiers, such as, N1 represents the primary base station, N2 represents the secondary base station, and ND represents DU and so on.

4. Bearer type indication information. The indication information may be explicit indication information. For example, the indication information may be set to one of the MN terminated bearer, or the SN terminated bearer, or the MN terminated secondary cell group (SCG) bearer, MN terminated split bearer, SN terminated SCG bearer, SN terminated master cell group (MCG) bearer, and SN terminated split bearer. The MN terminated means that the PDCP protocol layer is established on the MN, and the SN terminated means that the PDCP protocol layer is established on the SN. The SCG bearer means that the RLC protocol layer of the bearer is established on the SN, the MCG bearer means that the RLC protocol layer of the bearer is established on the MN, and the split bearer means that the bearer has two RLC protocol layers, and the RLC protocol layer is respectively established on the MN and the SN. Similarly, the indication information may also be implicit indication information. For example, it may systematically specify that different bearer types are identified through different identifiers.

5. Indication information of measurement level, for example, it is possible to set one of higher layer measurement, lower layer measurement, or overall measurement. It is also possible to set one of a PDCP layer, or an RLC layer, or overall measurement. Of course, it may also be implicit indication information, such as indicating different measurement levels through different identifiers.

Setting to "RLC layer" means that the measurement result is for the underlying protocol (also called lower layer protocol), including some or all protocols of the RLC/MAC/ physical layer, and/or the performance of Xn interface and/or F1 interface and/or the E1 interface parts. Setting to "overall measurement" means that the measurement results include the performance of the higher layer and lower layer parts, which does not need to be combined. For example, for the measurement of the downlink delay of a DRB, if the bearer is an MN terminated SCG bearer, the primary base station MN measures the delay at the PDCP layer, the secondary base station SN measures the delay at the Xn interface and the RLC/MAC layer, or the secondary base station measures the delay at the Xn interface and the RLC/MAC/physical layer, in the measurement report transmitted by the primary base station to the TCE or EM, the measurement level indication may be set to the "higher layer measurement" or the indication identifier of "higher layer measurement", and in the measurement report transmitted by the secondary base station to the TCE, the indication of the measurement level is set to "lower layer measurement" or the indication identifier of "lower layer measurement". If a bearer is established on the secondary base station and is an SN terminated SCG bearer, in the measurement report transmitted by the secondary base station to the TCE or EM, the measurement level indication is set to "overall measurement" or the indication identifier of "overall measurement".

It should be noted that the lower layer measurements involved in the embodiments of the present disclosure may include measurements on interfaces, such as measurements on some or all of Xn interface, F1 interface, E1 interface, and/or measurements on RLC/MAC/physical layer part or all protocol layer.

6. The DRB identification information, that is, the DRB identifier. The core network configuration bearer takes quality of service flow (QoS flow) as the minimum unit. The RAN transmits data to the UE through the DRB. Therefore, the RAN maps the QoS flow to the DRB. It is no longer one-to-one correspondence relationship between the QoS flow and the DRB. In order to allow the access network node, or the measurement center node, or the operation and maintenance node to combine multiple measurement reports (either received from other nodes or received from other nodes and obtained by itself performing MDT measurement), the measurement report needs to have an identifier, which indicates that multiple measurement results are directed to the same bearer. The DRB identifier uniquely identifies a data bearer within a UE, so it may play such a role. When the measurement for one DRB is performed by two or more nodes, the node performing the combining process may combine the measurement results according to the identifier of the DRB. For example, MN and SN measure the delay of a DRB, respectively. MN measures the delay of higher layer PDCP, SN measures the measurement of the lower layer (RLC/MAC/PHY), and MN and SN respectively transmit the measurement results to the second node (measurement center node or operation and maintenance node), the second node needs to combine the results according to the DRB identification information included in the measurement report to obtain the measurement result of the overall delay of DRB.

7. The DRB identification information may also be in other forms, that is, the DRB identification indication information may be in other forms. The QoS flow identifier is called QFI (qos flow identifier), and the indication information of QoS parameters corresponding to QoS flow is called 5QI (5G QoS Identifier). If a QoS flow is mapped to a DRB, the DRB may be identified by the QoS indication (5QI) corresponding to the QoS flow or the QFI corresponding to the QoS flow, which may be called mapped 5QI, or mapped QFI. If multiple QoS flows are mapped to a DRB, the mapped 5QI may be an indication of the QoS (5QI) corresponding to one, multiple, or all QoS flows, or the mapped QFI may be QFI corresponding to one, multiple, or all QoS flows.

8. Information of Qos Flow List, which may also be used as a DRB identification indication information. That is to say, the measurement report may also include an identifier list of the mapped QoS flow corresponding to the DRB, so as to provide the TCE or EM with more QoS-related information.

9. Measurement results. This information is a measurement value obtained by an access network node that needs to perform MDT measurement according to the MDT configuration.

In an optional embodiment of the present disclosure, the combining the third MDT measurement report and the first MDT measurement report includes: based on the same or related information contained in the third MDT measurement report and the first MDT measurement report, combining the third MDT measurement report and the first MDT measurement report.

That is, for multiple measurement reports that need to be combined (such as the first MDT measurement report and the third MDT measurement report, or the first MDT measurement report and the second MDT measurement report), the access network node, the measurement center node or the operation and maintenance node may perform combination based on the same information and/or associated information in each report, wherein the combining method may realize correlation (that is, it may be configured according to actual needs), or perform combination according to the provisions of the protocol.

In order to better describe the reporting scheme of MDT measurement provided in the embodiments of the present disclosure, the following further makes description with reference to several specific embodiments.

It should be noted that the solutions provided in the embodiments or examples of this present disclosure may be applied to the process of the activated signaling-based MDT and the process of the activated management-based MDT. The difference between the two lies mainly in that MDT configuration information for the activated signaling-based MDT is transmitted by the core network node, while MDT configuration information for the activated management-based MDT is transmitted by the operation and maintenance node. In addition, in the activated management-based MDT, the access network node that receives the MDT configuration information needs to transmit an MDT tracking message to the core network node, and the core network node transmits the unique identifier of the UE to the TCE.

The following description of the embodiment is described by taking the reporting process for the activated signaling-based MDT measurement as an example. Except for the above differences, the reporting method for the activated management-based MDT measurement is similar to that for the activated signaling-based MDT measurement. Based on the following examples provided by present disclosure, it is easy for a person skilled in the art to obtain a reporting method for the activated management-based MDT measurement.

Embodiment 1

In this embodiment, multiple nodes of the access network perform MDT measurement on a bearer of a certain UE. Each node measures a part of performance of the bearer. The performance may refer to parameters measured by MDT, such as delay, rate, and throughput. These nodes transmit the MDT measurement results measured by themselves to the node that combines the MDT measurement reports (hereinafter referred to as the combination processing node). For example, if the combination processing node is TCE (or EM), the TCE (or EM) performs the combining process to obtain the corresponding performance of the entire bearer.

In this embodiment, the multiple nodes performing MDT measurement may be a dual-connected primary base station and a secondary base station, or a CU of a base station in a separated RAN, a DU of a base station, a CU-CP, or a CU-UP.

The advantage of combining by TCE (or EM) is that under the architecture of separated access network (RAN), or in the case of having MN and SN, the data interaction between nodes of RAN is reduced. Each node of RAN provides sufficient information to the TCE, so that the TCE may combine the measurement results of multiple nodes according to the information provided by the RAN node to obtain a complete measurement result.

The access network node may be an LTE system or an access network device in a 5G system, or a device in another access mode. In this embodiment, a 5G system is taken as an example for illustration. If it is another node, the corresponding interface and message may also need to be modified accordingly. For example, in the 5G system, the interface between the core network node and the access network node is the NG interface, the interface between the access network node and the access network node in the 5G system is the Xn interface, and the interface between the CU and the DU is F1 interface, the interface between CU-CP and CU-UP is E1 interface.

Figure 4:
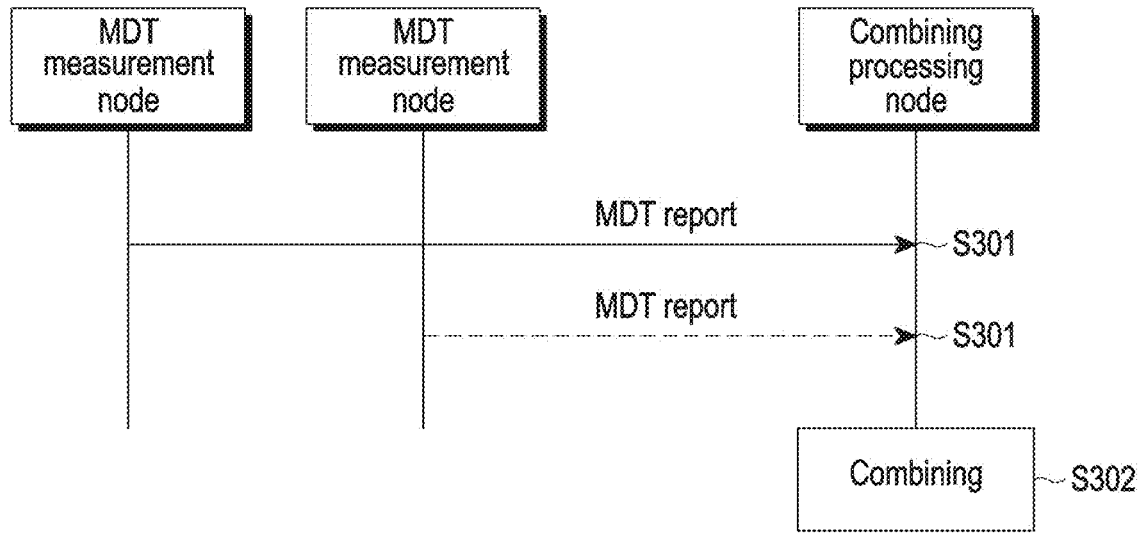
FIG. 4 illustrates a schematic flowchart of a first embodiment of the present disclosure.

FIG. 4 is a schematic flowchart of a method for reporting an MDT measurement according to the first embodiment. As shown in the figure, the method may include the following steps.

Step S301: the MDT measurement node transmits an MDT measurement report to the second node, such as the MDT report shown in the figure.

The MDT measurement node is a node that needs to perform MDT measurement, that is, an access network node. The MDT measurement node may be a dual-connected primary base station MN and a secondary base station SN, or one or more of CU, DU, or CU-CP, CU-UP. These nodes transmit their measured MDT measurement results to the combination processing node according to the configured reporting cycle. The combination processing node may be a measurement center node, such as TCE, or an operation and maintenance node, such as EM, or one of the primary base station (MN), the secondary base station (SN), CU, DU, CU-CP, and CU-UP.

The MDT measurement report transmitted by the MDT measurement node to the combination processing node includes sufficient information. The combination processing node combines the MDT measurement reports received from different MDT measurement nodes, or combines the MDT measurement reports received from other MDT measurement nodes and the MDT measurement reports obtained by itself. The MDT measurement report transmitted by the MDT measurement node may include one or more of the following information, as described above: the identifier of the MDT measurement, the MDT measurement type indication information, the node type indication information of nodes performing the MDT measurement, bearer type indication information, measurement level indication information, DRB identification indication information, and MDT measurement results. The DRB identification indication information may be one of more of a DRB identifier and identifier of QoS flow having a mapping relationship with the DRB, such as QFI, 5QI, QoS flow list and so on.

Step S302: the combination processing node combines the measurement reports, as shown in the figure.

As an optional manner, the combination processing node may be a TCE, or an operation and maintenance node, such as an operation and maintenance node EM.

The combination processing node may combine measurement reports received from multiple MDT measurement nodes based on the received report information. As several optional methods, when performing combination, the combination processing node may perform the following operations based on the received information.

Operation one: the combination processing node receives the measurement report from multiple nodes, and the received measurement report may include the following information: 1. names of TR, TRSR, and MDT measurements; 2. DRB ID; 3. measurement results.

Specifically, if the combination processing node receives a measurement report of the same type of MDT measurement for a UE, the judgment method is that the MDT measurement reports received by the combination processing node from multiple MDT measurement nodes include the same TR and TRSR, and the same MDT measurement name, it indicates that the received measurement reports are reports of the same type of measurements for the same UE, and the results of the same type of MDT measurements for the same UE may need to be combined. If multiple measurement reports received also contain the same data radio bearer identifier, that is, the DRB ID, the combination processing node knows that the multiple measurements are for different parts of the same DRB, and the combination processing node needs to combine multiple measurement results to obtain a complete measurement result of the entire DRB. For example, the combination processing node receives two measurement reports, where the measurement report received from one node is for the lower layer measurement, and the measurement report received from the other node is for the higher layer measurement. The combination processing node combines the received results of the report, wherein the combining method may realize correlation, or perform combination according to the provisions of the protocol.

Alternatively, the MDT measurement reports received by the combination processing node from multiple MDT measurement nodes include the same TR and TRSR, and the names of the related (associated) MDT measurements. For example, the name of the MDT measurement is set to a higher layer delay measurement in a measurement report. In another measurement report, the name of the MDT is set to a lower layer delay measurement, that is, a bottom layer delay measurement. These two measurement reports also contain the same DRB ID. The combination processing node knows that multiple measurements are directed to different parts of the same DRB. The combination processing node needs to combine multiple measurement results to obtain a complete measurement result for the entire DRB, wherein the combining method may realize correlation, or perform combination according to the provisions of the protocol.

Operation two: the combination processing node receives the measurement reports from multiple nodes, and the received measurement reports include the following information: 1. names of TR, TRSR, and MDT measurements; 2. DRB ID; 3. indication of measurement level; 4. measurement results.

As described above, the combination processing node determines that multiple measurement reports are directed to the same type of measurements for one UE, based on the same TR and TRSR, and the same name of MDT measurements. If multiple measurement reports received also contain the same DRB ID, the combination processing node knows that the multiple measurements are directed to different parts of the same DRB, and the combination processing node needs to combine multiple measurement results. According to the indication of the measurement level, the combination processing node can know how to perform combination. For example, MN and SN respectively measure the delay of a DRB, wherein MN measures the delay of higher layer PDCP, SN measures the delay of Xn interface and lower layer (RLC/MAC/PHY), and MN and SN respectively transmit the measurement results to TCE. In the measurement report transmitted by MN, the measurement level indication is set to "higher layer measurement" or "PDCP layer", and in the measurement report transmitted by SN, the measurement level indication is set to "lower layer measurement" or "RLC/MAC layer", the TCE may add the two measurement results to obtain the measurement result of overall delay of the DRB. The combining method may realize correlation or perform combination according to the provisions of the protocol.

Operation 3: the combination processing node receives measurement reports from multiple MDT measurement nodes. The received measurement reports include the following information: 1. names of TR, TRSR, and MDT measurements; 2. DRB ID; 3. node type; 4. bearer type; 5. measurement results.

As described above, the combination processing node determines that multiple measurement reports are directed to the same type of measurements for one UE, based on the same TR and TRSR, and the same name of MDT measurements. If multiple measurement reports received also contain the same DRB ID, the combination processing node knows that the multiple measurements are directed to different parts of the same DRB, and the combination processing node needs to combine multiple measurement results. According to the node type and bearer type, the combination processing node may learn how to perform combination. For example, the MN and SN respectively measure the delay of a certain DRB, and the bearer type is MN terminated SCG bearer. The MN measures the delay of the higher layer PDCP, the SN measures the delay of the Xn interface and the lower layer (RLC/MAC/PHY), and the MN and SN respectively transmits the measurement results to the TCE. In the measurement report transmitted by the MN, the node type was set to "MN", the bearer type is set to "MN terminated", and the combination processing node knows that the measurement report transmitted by the MN is directed to the measurement of PDCP. In the measurement report transmitted by the SN, the node type is set to "SN" the bearer type is set to "MN terminated", and the combination processing node may know that the measurement report transmitted by the SN is directed to the lower layer measurement. The combination processing node may add the two measurement results to obtain measurement result of the overall delay of the DRB.

As another example, if the bearer type is MN terminated split bearer, MN measures the delay of the higher layer PDCP and the lower layer of MN, SN measures the delay of the Xn interface and the lower layer (including the MN and SN interfaces, RLC/MAC/PHY), the MN and SN respectively transmit the measurement results to the TCE. In the measurement report transmitted by the MN, the node type is set to "MN" and the bearer type is set to "MN terminated split". The combination processing node can know that the measurement report transmitted by the MN is directed to a measurement of the overall DRB. In the measurement report transmitted by the SN, the node type is set to "SN" and the bearer type is set to "MN terminated split". The combination processing node can know that the measurement report transmitted by the SN is directed to a measurement of the lower layer. The combination processing node may perform some calculations on the two measurement results. For example, the two measurement results may be added together and then averaged. It may be understood that the specific calculation method may be a standard definition method, or a method to realize the correlation to obtain measurement result of the overall delay of the DRB.

It may be known from the foregoing description that, in addition to the measurement center node or the operation and maintenance node, the combination processing node may also be one of the primary base station MN, the secondary base station SN, CU, DU, CU-CP, and CU-UP. According to the received report information, i.e., the MDT measurement reports, the combination processing node may combine the received measurement results reported by the MDT measurement nodes with the measurement results measured by itself to obtain the overall measurement result, or the combination processing node may combine measurement reports received from multiple MDT measurement nodes. The combining method performed by RAN nodes has the advantage that a complete MDT measurement report is formed by a certain RAN node and transmitted to TCE or EM, which reduces the impact on the core network. For TCE or EM, etc., TCE or EM does not need to know whether the RAN is separated and whether the MN and SN are provided. Operations of TCE or EM do not depend on the architecture of the RAN. In this method, as an example, the combination processing node may perform the following operations according to the received information.

The combination processing node receives measurement reports from multiple nodes. The received measurement reports include the following information: 1. names of TR, TRSR, and MDT measurements; 2. DRB ID.

The combination processing node determines that multiple measurement reports are directed to the same type of measurements for one UE, based on the same TR and TRSR, and the same name of MDT measurements. If multiple measurement reports received also contain the same DRB ID, the combination processing node knows that the multiple measurements are directed to different parts of the same DRB, and the combination processing node needs to combine multiple measurement results. The combination processing node has already known the measurement report on the MDT measurement node and known which part of the measurement result is reported by the MDT measurement node. The combination processing node may combine the results to obtain the measurement result of entire DRB. The combining method may realize correlation, or perform combination according to the provisions of the protocol. After the measurement results of the entire DRB are obtained, in this example, the combination processing node may transmit the measurement results to the destination nodes such as TCE or EM after the measurement reports are combined.

Embodiment 2

This embodiment describes the process of reporting MDT measurement in which the access network is a CU and DU separation architecture. In this embodiment, both the CU and the DU perform MDT measurement. The report of the MDT measurement may be that the CU and the DU transmit the measurement report to the MDT central node (TCE) or the operation and maintenance node (such as the EM), the following uses TCE as an example to make illustration; or the DU transmits the measurement report to the CU, and the CU combines the measurement report obtained by itself with the measurement report received from the DU and transmits the combined measurement report to TCE, or the CU transmits the measurement report to the DU, and the DU combines the measurement report obtained by itself with the measurement report received from the CU and transmits the combined measurement report to TCE. These methods are described separately in this embodiment.

The core network node in this embodiment may be an MME in the LTE system, or an AMF in a 5G system, or a core network entity in another system. The access network node may be the base station central unit (CU) and the distribution unit (DU) in the LTE system, or the base station central unit (CU) and the distribution unit (DU) in the NR system, or two parts corresponding to the CU and the DU separated from the base station in other RAT systems.

Figure 5:
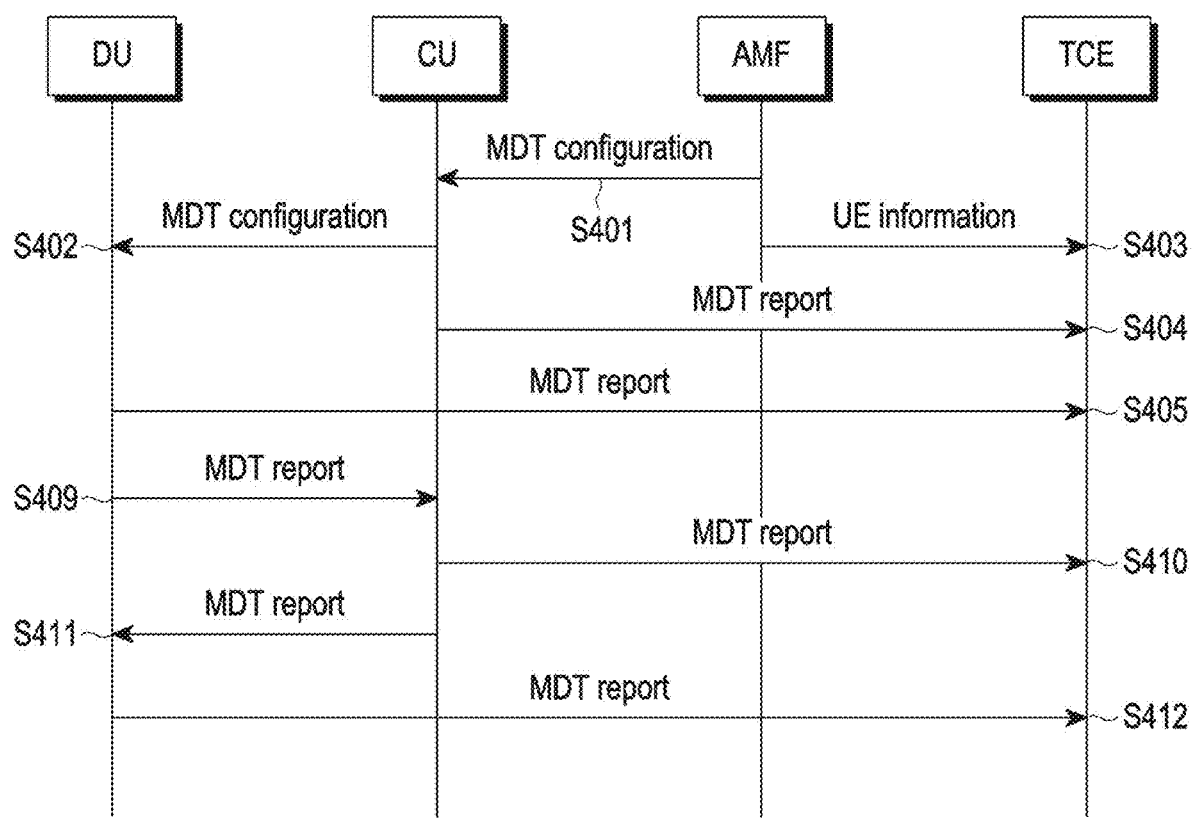
FIG. 5 illustrates a schematic flowchart of a second embodiment of the present disclosure.

In the following description of this embodiment, CU and DU in a 5G system are used as examples for illustration. If they are other nodes, the corresponding interface and message also need to be modified accordingly. For example, in the 5G system, the interface between the core network node and the access network node is an NG interface, or an S1 interface in the LTE system; the interface between the access network node and the access network node in the 5G system is an Xn interface, or an X2 interface in the LTE system. As shown in FIG. 5, the method may include steps S401 to S405, or may include steps S401 to S403 and steps S409 and S410, or may include S401 to step S403 and steps S411 or S412. Each of steps is described separately in the following.

Step S401: the core network node (AMF shown in the figure) transmits an MDT activation request message to the CU, wherein the message carries the MDT configuration information.

The MDT configuration information may include one or more of the following information.

αIdentifier of MDT measurement, such as TR and TRSR. This identifier is a unique identifier across the entire network, including the identifier of the PLMN and an ID, which identifies a certain MDT measurement of MDT.

IP address of the measurement center node (such as TCE), which is the that receives the measurement report.

Name of the measurement, also referred to as the measurement mode, or the type of measurement, specifically indicates what kind of measurement is performed. For example, the measurement may be data delay measurement, F1 delay measurement, DU delay measurement, and the like.

Reporting configuration, including reporting period, reporting threshold and so on.

Step S402: The CU transmits an MDT activation request message to the DU, wherein the message carries MDT configuration information.

The MDT configuration information in this step may be the same as or different from the MDT configuration information in step S401, but they are at least correlated.

If a certain type of MDT measurement requires both the CU and the DU to participate in the measurement, the CU transmits the configuration information of the above MDT measurement to the DU. The name of the measurement may be the same as the name of the measurement in the configuration information in step S401, or the name of the measurement in step S402 is correlated to the name of the measurement in step S401. This relationship may be an inclusive relationship or including the same part, or the name with a corresponding relationship specified in the protocol, for example, the measurement name of step S401 is D1, the measurement name of step S402 is D1-1, and the name of the measurement of step S401 is delay, and the name of the measurement of step S401 is measurement of the lower layer delay.

Step S403: The core network node transmits a message to the MDT measurement center node (TCE shown in the figure), wherein the message carries the identifier of the MDT measurement and the identification information of the UE (only the identification information of the UE is shown in the figure), for example IMSI or IMEI (or IMEISV).

Step S404: The CU transmits an MDT measurement report to the TCE.

The CU performs measurement according to the configuration. For a certain MDT measurement type that requires both the CU and the DU to participate in the measurement, the CU measures its own part, and then the CU transmits the measurement result to the TCE according to the configuration of the measurement report. For example, in step S401, the AMF is configured to measure the delay of uplink and downlink data of some UE, the CU measures the delay of the PDCP part of each data radio bearer, and the CU transmits the measurement result of the part to the TCE through a measurement report. The MDT measurement report may include one or more of the following information.

1. The identifier of the MDT measurement, such as TR and/or TRSR. This identifier is a unique identifier across the entire network, including the identifier of the PLMN and an ID, which uniquely identifies a certain MDT measurement of the MDT.

2. The name of the MDT measurement (that is, an optional scheme for MDT type indication information). This information indicates what type of MDT the MDT measurement report is directed to. For example, the name of MDT measurement is M4, M4 represents data volume measurement (such as data volume measurement separately for DL and UL), the name of MDT measurement is M5, and M5 represents throughput measurement (such as scheduled IP throughput for MDT measurement separately for DL and UL), the name of MDT measurement is M6, M6 represents data delay measurement (such as packet delay measurement separately for DL and UL).

3. Node type. The node type indicates the type of the RAN node that measures MDT and may be set to one of DU, CU, CU-UP, and CU-CP.

4. The measurement level indication, which may be set to one of higher layer measurement, lower layer measurement or overall measurement, and it also may be set to one of the PDCP layer, or the RLC/MAC layer, or the overall measurement. Specifically, it is as described in the foregoing description of the measurement level indication information.

5. DRB identification information. Since the access network maps QoS flow to DRB, there is no longer a one-to-one correspondence relationship between multiple QoS flows and DRBs. When the measurement for one DRB is performed by two or more nodes, the TCE also needs to combine the measurement results according to the identifier of the DRB.

6. DRB identification information, which may also be in other forms. The identifier of the QoS flow is called as QFI, and the indication information of the QoS parameter corresponding to the QoS flow is called as 5QI. If a QoS flow is mapped to a DRB, the DRB may be identified by the QoS indication (5QI) corresponding to the QoS flow or the QFI corresponding to the QoS flow, which is called as mapped 5QI, or mapped QFI. If multiple QoS flows are mapped to a DRB, the CU may determine the mapped 5QI corresponding to one or more DRBs. This mapped 5QI may be an indication of the QoS (5QI) corresponding to one or more QoS flows, or the CU determines the mapped QFI corresponding to a DRB. This mapped QFI is the QFI corresponding to one of the QoS flows. During the process of establishing a data radio bearer by the CU, such as a UE context establishment/modification request, the CU transmits the mapped 5QI or corresponding mapped QFI of the data radio bearer to the DU. The DU saves the information of the radio data bearer, such as including the DRB ID, mapped 5QI, mapped QFI, for later processes. The measurement report transmitted by the CU to TCE includes mapped 5QI (or mapped QFI) and measurement results. TCE may determine whether multiple measurement results are for the same data radio bearer or for the same QoS level through mapped 5QI (or mapped QFI). It may combine multiple measurement results.

Step S405: The DU transmits an MDT measurement report to the TCE.

The information of the MDT measurement report is as described in step S404. During the establishment of the data radio bearer, the DU obtains one or more of the DRB ID, mapped 5QI, and mapped QFI from the CU. The DU may include one or more of the DRB ID, mapped 5QI, and mapped QFI in the measurement report.

After the TCE receives the measurement reports of steps 404 and 405, the TCE may combine the measurement results. The combining process is as described previously.

This embodiment also describes another reporting method. In this method, the DU transmits the measurement results to the CU, the CU combines the measurement results, and then the CU transmits the measurement report to the TCE. The method may include steps S401 to S403, as well as the following steps S409 and S410.

Step S409: The DU transmits an MDT measurement report to the CU.

The DU performs measurement according to the configuration and transmits the measurement results to the CU according to the configuration of the measurement report. The results may be transmitted to the CU through the user plane or the control plane. For example, the DU is required to measure the data delay of the lower layers of the DU (for example, including the F1 interface, RLC, MAC and other protocol layers). The DU adds the delay on the F1 interface and the data delay on the DU to obtain the delay of DU part. The DU transmits the delay of the DU part to the CU. The CU itself also measures the delay of the data in the CU part, such as the delay at the PDCP layer. The CU integrates the measurement results to form the delay measurement results of the data in the access network, and then transmit the measurement results to the MDT central node TCE according to reporting configuration.

The measurement report transmitted by the DU may include TR, TRSR, measurement name, DRB identification information (such as one or more of DRB ID, mapped 5QI corresponding to DRB, and mapped QFI corresponding to DRB), and the measurement result. According to the DRB identification information, the CU may combine the measurement results to obtain the measurement results of the entire DRB.

Step S410: The CU transmits an MDT report to the TCE.

The CU receives the measurement report transmitted by the DU, and combines the measurement results to obtain the measurement result of entire DRB according to the received measurement report and the TR, TRSR, measurement name, and DRB identification information contained in the measurement report. For specific combining methods, refer to the corresponding descriptions in the foregoing.

According to the configuration of the measurement report, the CU transmits the combined measurement result to the TCE. The combined measurement report may include TR, TRSR, measurement name, DRB identification information, and combined measurement results.

This embodiment also describes another reporting method. In this method, the CU transmits the measurement result to the DU, and the DU combines the measurement results, and then the DU transmits the measurement report to the TCE. The method may include steps S401 to S403, as well as the following steps S411 and S412.

Step S411: The CU transmits an MDT measurement report to the DU.

The CU performs measurement according to the configuration. For a certain MDT measurement type that requires both the CU and the DU to participate in the measurement, the CU measures its own part, and then the CU transmits the measurement results to the DU according to the configuration of the measurement report. The measurement result may be transmitted to the DU through the user plane or control plane, and the information contained in the measurement report transmitted by the CU to the DU may also refer to the description above.

Step S412: The DU transmits an MDT measurement report to the TCE.

The DU performs measurement according to the configuration. The DU receives the measurement report transmitted by the CU, and combines the measurement results according to the TR, TRSR, measurement name, and DRB identification information included in the received measurement report and the measurement report measured by itself, to obtain the measurement results of the entire DRB. For specific combining methods, refer to the corresponding descriptions in the foregoing.

According to the configuration of the measurement report, the DU transmits the combined measurement result to the TCE. The combined measurement report may include TR, TRSR, measurement name, DRB identification indication information, and combined measurement results.

Embodiment 3

This embodiment describes a reporting process of an MDT measurement report in which the access network is a CU-CP, CU-UP, and DU separation architecture. Both CU-UP and DU perform MDT measurement. When performing measurement reporting, CU-UP and DU may transmit the measurement report to the MDT central node TCE, or CU-UP and DU transmit the measurement report to CU-CP.

The CU-CP combines the measurement reports and transmits the combined measurement report to the MDT central node TCE, or the DU transmits the measurement result to the CU-UP, and the CU-UP transmits the measurement report to the MDT central node TCE.

Similarly, the core network node in this embodiment may be an MME in the LTE system, or an AMF in a 5G system, or a core network entity in another system.

Figure 6:
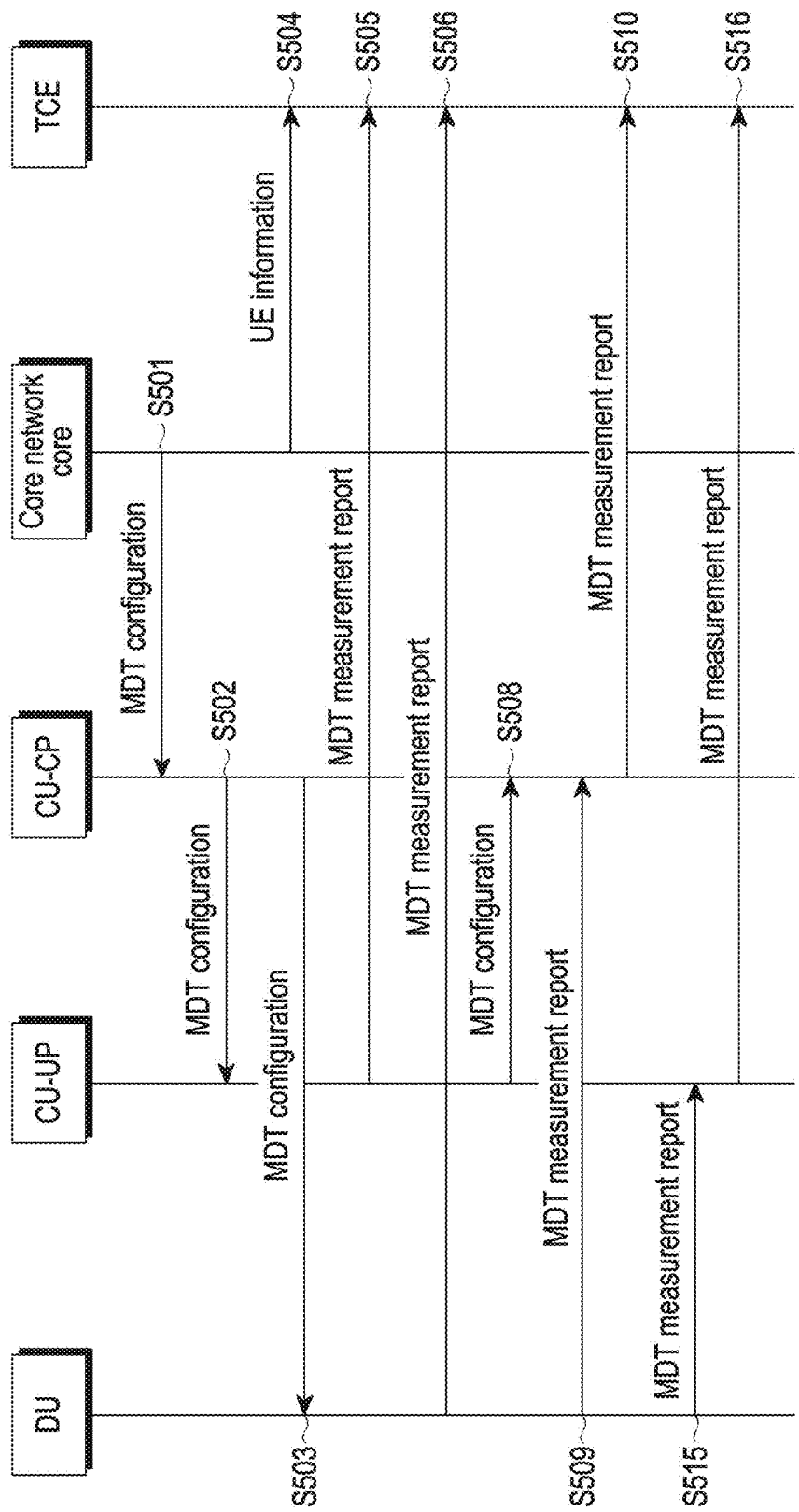
FIG. 6 illustrates a schematic flowchart of a third embodiment of the present disclosure.

In this embodiment, CU-CP, CU-UP, and DU in a 5G system are used as examples for description. If they are other nodes, the corresponding interface and message also need to be modified accordingly. For example, in the 5G system, the interface between the core network node and the access network node is the NG interface, the S1 interface in the LTE system; the interface between the access network node and the access network node in the 5G system is the Xn interface, and the X2 interface in the LTE system. As shown in FIG. 6, the reporting method in this embodiment may mainly include steps S501 to S505, or may include steps S501 to S503, and S508 to step S510, or may include steps S501 to S503, and S515 to step S516, each of steps in each optional embodiment is specifically described below.

Step S501: The core network transmits an MDT activation request message to the CU-CP, wherein the message carries MDT configuration information.

The MDT configuration information may include one or more of the following information.

Identifier of MDT measurement, such as TR and TRSR. This identifier is a unique identifier for the network, including the identifier of the PLMN and an ID, which identifies an MDT measurement of the MDT.

IP address of the measurement center node (such as TCE), which is the that receives the measurement report.

Name of the measurement, also called as the mode of measurement, or the type of measurement, which specifically refers to which measurement is performed. For example, the measurement may be data delay measurement, F1 delay measurement, and DU delay measurement.

Reporting configuration, which may include information such as reporting period, reporting threshold and so on.

Step S502: The CU-CP transmits an MDT activation request message to the CU-UP, wherein the message carries MDT configuration information.

If a certain type of MDT measurement requires both CU-UP and DU to participate in the measurement, the CU-CP transmits the configuration information of the above MDT measurement to the CU-UP. The MDT configuration information in this step may be the same as or correlated to the MDT configuration information in step S501. For example, the name of the measurement in the configuration information in this step may be the same as the name of the measurement in step 501, or the name of the measurement in step S502 is correlated to the name of the measurement in step S501. This relationship may be an inclusive relationship, or including the same part, or the name with a corresponding relationship specified in the protocol, for example, the measurement name of step S501 is D1, the measurement name of step S502 is D1-1, and for example, the measurement name of step S501 is delay, the measurement name of step S502 is higher layer delay.

Step S503: The CU-CP transmits an MDT activation request message to the DU, wherein the message carries MDT configuration information.

If a certain type of MDT measurement requires both CU-UP and DU to participate in the measurement, the CU-CP transmits the configuration information of the above MDT measurement to the DU. The configuration information in this step may be the same as or correlated to the configuration information in step S501. For example, the measurement name in the configuration information in this step may be the same as the measurement name in step S501. The measurement name in the step 503 is correlated to the measurement name in step S501. This relationship may be an inclusive relationship, or including the same part, or a name with a corresponding relationship specified in the protocol. For example, the name of the measurement in step S501 is D1, and the name of the measurement in step S503 is D1-2. For example, the name of the measurement in step S501 is the delay, and the name of the measurement in step S503 is the measurement of the lower layer delay.

Step S504: The core network node transmits a message to the MDT measurement center node (TCE shown in the figure), wherein the message carries the identifier of the MDT measurement and the identification information of the UE, such as IMSI or IMEI (or IMEISV), to the MDT center node.

Step S505: The CU-UP transmits an MDT measurement report to the TCE.

CU-UP performs measurement according to the configuration. For a certain MDT type that requires both CU-UP and DU to participate in the measurement, CU-UP measures its own part, and then CU-UP transmits the measurement result to TCE according to the configuration of the measurement report. For example, in step S501, a core network node (such as AMF) is configured to measure the delay of uplink and downlink data of a UE, and the CU-CP configures CU-UP to measure the delay of the PDCP part of each data radio bearer. The measurement results of this part are transmitted to TCE through the measurement report. The MDT measurement report may include one or more of the following information.

1. Identifier of the MDT measurement, such as TR and/or TRSR. This identifier is a unique identifier across the entire network, including the identifier of the PLMN and an ID, which uniquely identifies a certain MDT measurement of the MDT.

2. Name of the MDT measurement, and it indicates which type of MDT the MDT measurement report is directed to. The details are as described above.

3. Node type. The node type indicates the type of the RAN node that measures MDT. You can set one of DU, CU, CU-UP, and CU-CP.

4. The measurement level indication, which may be set to one of higher layer measurement, lower layer measurement or overall measurement. It may also be set to one of the PDCP layer, or the RLC/MAC layer, or the overall measurements. The details are as described above.

5. DRB identification information. The details are as described above.

6. The DRB identification information may also be in other forms, such as mapped 5QI or mapped QFI. For the mapped 5QI or mapped QFI, refer to the specific description in the first embodiment. When the CU-CP establishes a data radio bearer, such as a UE context establishment/modification request, the CU-CP transmits the mapped 5QI or corresponding mapped QFI corresponding to the data radio bearer to the CU-UP, and the CU-UP saves the information of radio data bearer, which may include one or more of a DRB ID, a mapped 5QI, or a mapped QFI, for subsequence process. The measurement report transmitted by the CU-UP to the TCE may include one or more of the DRB ID, the mapped 5QI, or the mapped QFI, and the measurement result. The TCE may determine through DRB identification information (such as the DRB ID, the mapped 5QI, or the mapped QFI, etc.) that multiple measurement results are for the same data radio bearer or for the same QoS level. The multiple measurement results may be combined. The specific process is the same as the previous method.

Step S506: The DU transmits an MDT measurement report to the TCE.

The information of the MDT measurement report is as described in step S505. During the establishment of the data radio bearer, the DU obtains the DRB ID (or the mapped 5QI/mapped QFI corresponding to the DRB) from the CU-CP. The DU may include one or more of the DRB ID or the mapped 5QI or the mapped QFI in the measurement report.

The TCE receives the measurement reports of steps S505 and S506, and the TCE combines the measurement results. For the combining process, refer to the description in the foregoing.

This embodiment also describes another method for reporting, that is, performing combination by a certain node of the RAN. In this method, the DU and CU-UP may transmit the measurement results to the CU-CP, the CU-CP combines the measurement results, and then the CU-CP transmits the combined measurement report to the TCE. The method may include steps S501 to S503, and steps S508, 509, and 510 described above. The details are as follows.

Step S508: The CU-UP transmits an MDT measurement report to the CU-CP.

CU-UP performs measurement according to the configuration and transmits the measurement results to the CU-CP according to the configuration of the measurement report. The results may be transmitted to the CU-CP through the user plane or the control plane. For example, CU-UP is required to perform data delay measurement at higher layers (such as the delay of PDCP, and/or NG interface user plane). CU-UP obtains the delay of CU-UP, and CU-UP transmits a part of measurement results to CU-CP.

The measurement report transmitted by CU-UP may include TR, TRSR, measurement name, DRB ID, measurement result and so on.

Step S509: The DU transmits an MDT measurement report to the CU-CP.

The DU performs measurement according to the configuration and transmits the measurement results to the CU-CP according to the configuration of the measurement report. The results may be transmitted to the CU-CP through the user plane or the control plane. For example, DU is required to measure the data delay of the lower layer of the DU part (for example, including F1, RLC, and MAC). The DU adds the delay on the F1 interface and the data delay on the DU to obtain the delay of DU part. The delay of the DU part is transmitted to the CU-CP, and the CU-CP also gets the measurement structure of the CU-UP. The measurement of the CU-UP part is obtained, such as the delay of the PDCP layer, and the CU-CP integrates the measurement results to form the delay measurement result of the data in the access network, and then transmits the measurement result to the MDT central node TCE according to the report configuration.

The measurement report transmitted by the DU may include TR, TRSR, measurement name, DRB ID (or mapped 5QI/mapped QFI corresponding to DRB), and CU-CP may combine the measurement results according to the DRB ID (or mapped 5QI/mapped QFI corresponding to DRB), to obtain the measurement results of the entire DRB.

Step S510: The CU-CP transmits an MDT report to the TCE.

The CU-CP receives the measurement report transmitted by the DU and the measurement report transmitted by the CU-UP. According to the TR, TRSR, measurement name, DRB ID (or the mapped 5QI/mapped QFI corresponding to the DRB) contained in the measurement report, the CU-CP may combine the measurement results. For specific combining methods, please refer to the descriptions in the foregoing.

According to the configuration of the measurement report, the CU-CP transmits the measurement results to the TCE. The measurement report includes the TR, TRSR, measurement name, DRB ID (or mapped 5QI/mapped QFI corresponding to the DRB), and the measurement results.

This embodiment also describes another method for reporting, that is, performing combination by a certain node of the RAN. In this method, the DU transmits the measurement result to the CU-UP, the CU-UP combines the measurement results, and then the CU-UP transmits the measurement report to the TCE. In this case, the method may include steps S501 to S503, and steps S515 and S516.

Step S515: The DU transmits an MDT measurement report to the CU-UP.

The DU performs measurement according to the configuration and transmits the measurement results to the CU-UP according to the configuration of the measurement report. The results may be transmitted to the CU-UP through the user plane or the control plane. For example, the DU is required to measure the data delay of the lower layer of the DU part (for example, including the F1 interface, RLC, and MAC). The DU adds the delay on the F1 interface and the data delay on the DU to obtain the delay of the DU part. DU transmits the delay of the DU part to the CU-UP. One DU may be connected to multiple CU-UPs. Different data radio bearers may be established on different CU-UPs. In the process of establishing the UE context, DU have already known the relationship of the DRB and CU-UP, so the DU may transmit a measurement result for DRB to a corresponding CU-UP. CU-UP also performs measurements on the CU-UP part, such as the delay at the PDCP layer. CU-UP integrates the measurement results to form the delay measurement results of the data in the access network, and then transmits the measurement results to the MDT central node TCE according to the report configuration.

The measurement report transmitted by the DU may include TR, TRSR, measurement name, DRB ID (or mapped 5QI/mapped QFI corresponding to DRB), and measurement results. According to the DRB ID (or the mapped 5QI/mapped QFI corresponding to the DRB), the CU-UP may combine the measurement results to obtain the measurement result of entire DRB.

Step S516: The CU-UP transmits an MDT report to the TCE.

CU-UP receives the measurement report transmitted by the DU. According to the TR, TRSR, measurement name, and DRB ID (or mapped 5QI/mapped QFI corresponding to DRB) contained in the measurement report, the measurement results are combined to obtain the measurement results of the entire radio bearer. The specific combining method is shown above.

According to the configuration of the measurement report, CU-UP transmits the overall measurement result to TCE. The measurement report includes TR, TRSR, measurement name, DRB ID (or mapped 5QI/mapped QFI corresponding to DRB), and measurement results.

It should be noted that the third embodiment is also described by taking the process of activated signaling-based MDT as an example. In fact, the method of the third embodiment is also suitable for activated management-based MDT. The method of reporting MDT measurement report is similar.

In addition, in the system architecture according to the third embodiment, the CU-CP may also transmit a measurement report measured by the CU-CP to the DU, and the DU may combine the measurement report measured by itself and the measurement report received from the CU-CP and transmit the combined measurement report to TCE.

Embodiment 4

This embodiment describes how the primary base station MN and the secondary base station SN transmit measurement reports under dual connectivity. For the measurement of a certain MDT of a UE, both the MN and the SN participate in the measurement of the MDT. After performing measurement, the process of reporting the measurement results by the MN and the SN is described in this embodiment. In this scenario, an optional method is that the MN and SN transmit the measurement results to the MDT central node TCE, and the TCE combines the measurement results, or the SN transmits the measurement results to the MN, and the MN combines the measurement results, and transmits the combined measurement results to TCE, or the lower layer measurement results are transmitted to the entity where the higher layer is located, and the entity where the high layer is located transmits the measurement results to the TCE.

In this embodiment, the core network node may be a mobile management entity MME in the LTE system, or an AMF in a 5G system, or a core network entity in another system.

Figure 7:
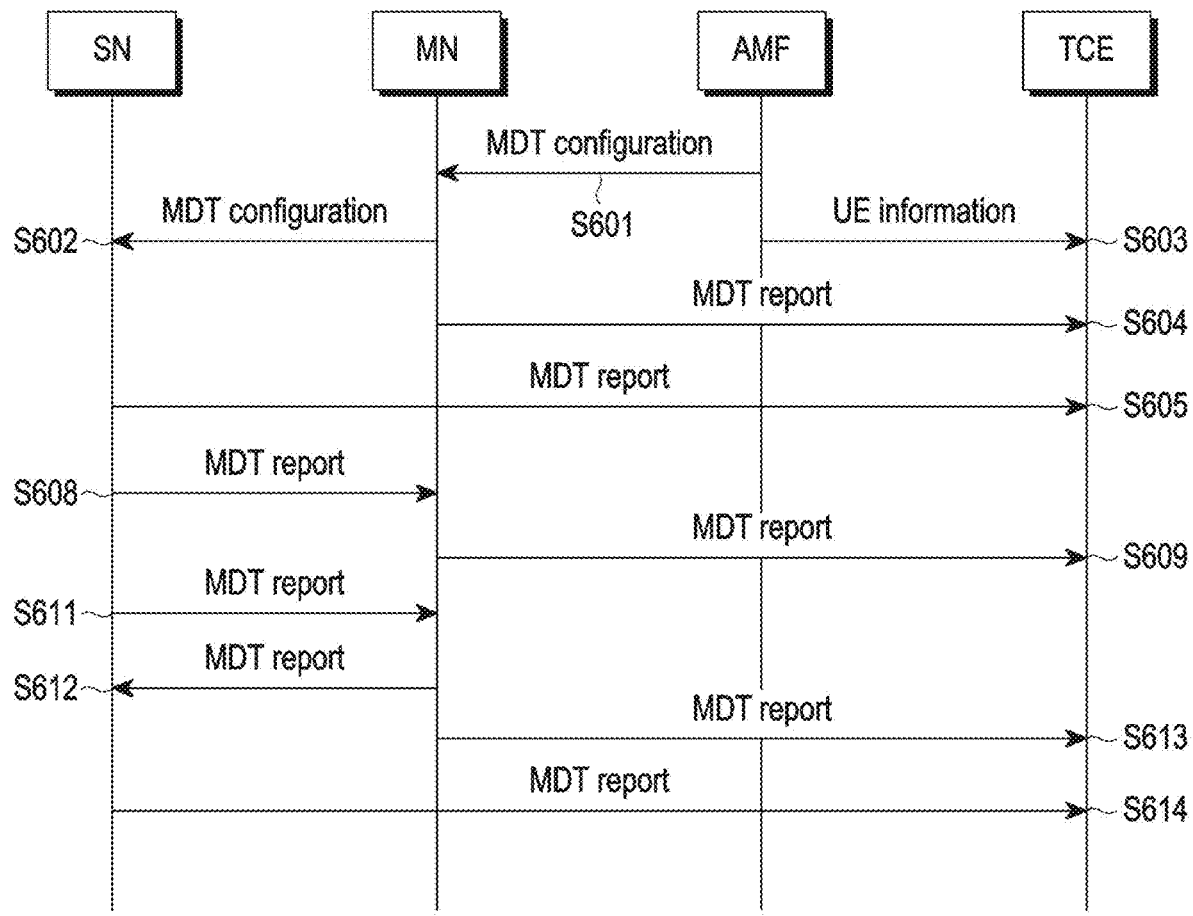
FIG. 7 illustrates a schematic flowchart of a fourth embodiment of the present disclosure.

The primary base station and the secondary base station may be base stations in the same RAT system, or base stations in different RAT systems. For example, the primary base station may be a 4G base station or a 5G base station. The secondary base station may be a 4G base station or a 5G base station. As shown in FIG. 7, the reporting method in this embodiment may include steps S601 to 605, or may include steps S601 to S603 and steps S608 and S609, or may include steps S601 to S603 and steps S611 and steps S614, the specific description is as follows.

Step S601: The core network transmits an MDT activation message to the MN, wherein the message carries MDT configuration information.

The MDT configuration information may include one or more of the following information.
  MDT measurement identifier (such as TR and TRSR), this identifier is a unique identifier across the network, including the PLMN identifier and an ID, which identifies a certain MDT measurement of MDT.
  IP address of the measurement center node (such as TCE), which is the that receives the measurement report.
  Name of the measurement, also called as the measurement mode, or the type of measurement, which specifically refers to which measurement is performed. The specific is as described above.
  Reporting configuration, which may include information such as reporting period and reporting threshold and so on.

Step S602: The MN transmits an MDT activation request message to the SN, wherein the message carries MDT configuration information.

If a certain type of MDT measurement requires both the MN and the SN to participate in the measurement, the MN transmits the configuration information of the above MDT measurement to the SN. The measurement name may be the same as the measurement name of step S601, or the measurement name of step S602 has a relationship with the measurement name of step S601. This relationship may be an inclusive relationship, or including the same part, or the name with the correspondence relationship specified by protocol, for example, the measurement name in the configuration information in step S601 is D1, the measurement name in the configuration information in step S602 is D1-1, and for example, the measurement name in the configuration information in step 601 is delay, and the measurement name in the configuration information in step S602 is the measurement of higher layer delay.

Step S603: The core network node transmits a message to the MDT measurement center node, wherein the message carries the identifier of the MDT measurement and the identification information of the UE, such as IMSI or IMEI (IMEISV), to the MDT center node.

Step S604: The MN transmits an MDT measurement report to the TCE.

The MN performs measurement according to the configuration. For a certain MDT type that requires both the MN and the SN to participate in the measurement, the MN measures its own part, and then the MN transmits the measurement result to the TCE according to the configuration of the measurement report. For example, in step 601, the AMF is configured to measure the delay of uplink and downlink data of a UE. One UE may have multiple data radio bearers, and these data radio bearers may have different bearer types. For example, the UE has two data radio bearers. One is the SN terminated SCG bearer and the other is the MN terminated split bearer. SN terminated means that the PDCP protocol layer is established on the SN, and MN terminated means that the PDCP protocol layer is established on the MN. The SCG bearer means that the RLC/MAC/physical layer is established on the SN. Split bearer means that two RLC/MAC/physical layers are established for this data radio bearer, one on the MN and one on the SN. As described above, for the UE's SN terminated SCG bearer, PDCP is on the SN, and the lower layer protocol RLC/MAC/physical layer is established on the SN. The SN may measure the performance of the overall data radio bearer, such as delay. For the UE's MN terminated split bearer, the data received by the MN from the core network is divided into two transmission paths. One path is transmitted to the UE through the PDCP/RLC/MAC/physical layer on the MN. This path may be called as MCG leg. The PDCP on the MN copies or divides the data and transmits the copied data or the divided data to the UE through the RLC/MAC/physical layer on the SN. This path may be called as an SCG leg. For the MN terminated split bearer or the MN terminated SCG bearer, the MN is responsible for measuring the performance of the PDCP part of each data radio bearer, such as the delay. The MN transmits the measurement results of this part to the TCE through a measurement report, and the SN is responsible for measuring the performance of the lower layer part, such as delay. For the SN terminated split bearer or the SN terminated MCG bearer, the MN is responsible for measuring the performance of the lower layer part, and the SN is responsible for measuring the performance of the lower layer part, such as delay. In this step, the MN transmits its own measurement result to a TCE, and the TCE combines the measurement results. The MDT measurement report includes one or more of the following information.

1. Identifier of the MDT measurement, such as TR and/or TRSR. This identifier is a unique identifier across the entire network, including the identifier of the PLMN and an ID that uniquely identifies a certain MDT measurement of the MDT.

2. Name of the MDT measurement. It indicates which type of MDT the MDT measurement report is directed to, as described previously.

3. Node type. The node type indicates the type of the RAN node that measures MDT. It may be set to one of the primary base station and the secondary base station.

4. Bearer type. The bearer type may be set to MN terminated or SN terminated or MN terminated SCG, MN terminated split, SN terminated SCG, SN terminated MCG, or SN terminated split.

5. The measurement level indication, which may be set to one of higher layer measurement, lower layer measurement or overall measurement. It may also be set to one of the PDCP layer, or the RLC/MAC layer, or the overall measurements. The overall measurement is that the measurement results include the higher and lower layers and do not need to be combined. For example, for the measurement of the downlink delay of a DRB, if the bearer is an MN terminated SCG bearer, the primary base station MN measures the delay at the PDCP layer, the secondary base station SN measures the delay at the Xn interface and the RLC/MAC layer, or the secondary base station measures the delay of the Xn interface and the RLC/MAC physical layer, in the measurement report transmitted by the primary base station to TCE, the measurement level indication is set to "higher layer measurement" and in the measurement report transmitted by the secondary base station to TCE, the measurement level indication is set to "lower layer measurement". If a bearer is established on the secondary base station and is an SN terminated SCG bearer, the measurement level indication in the measurement report transmitted by the secondary base station to the TCE is set to "overall measurement". When referring to lower layer measurements below, measurements on interfaces may be included, such as measurement on Xn interface, F1 interface, E1 interface, and RLC/MAC measurement, or include both measurement on Xn interface, and RLC/MAC/Physical layer measurement 6. DRB identification information. The details are as described above. The TCE needs to combine the results according to the DRB identification information included in the measurement report to obtain the delay measurement result of the entire DRB.

7. DRB identification information may also be in other forms, such as mapped 5QI, or mapped QFI. Mapped 5QI or mapped QFI is shown above. In the process of establishing a dual connection by the MN, for example, the SN Addition Request/Modification Request, the MN transmits the mapped 5QI corresponding to the data radio bearer or the mapped QFI corresponding to the data radio bearer to the SN, and the SN saves the information of the radio data bearer, including DRB ID, mapped 5QI (Or mapped QFI) for subsequent processes. The measurement report transmitted by the MN to the TCE includes mapped 5QI (or mapped QFI) and measurement results. The TCE may determine whether multiple measurement results are for the same data radio bearer or for the same QoS level through the mapped 5QI (or mapped QFI). The multiple measurement results may be combined, the specific process is the same as the above method.

Step S605: The SN transmits an MDT measurement report to the TCE.

For information about the MDT measurement report, refer to the description in step S604. During the establishment of the data radio bearer, the SN obtains the DRB ID (or the mapped 5QI/mapped QFI corresponding to the DRB) from the MN. The SN may include the DRB ID or the mapped 5QI or the mapped QFI in the measurement report.

The TCE receives the measurement reports in steps 604 and 605, and TCE combines the measurement results. The combining process may be referred in the description above.

This embodiment also describes another reporting method, that is, performing combination by a certain node of the RAN. In this method, the SN transmits the measurement results to the MN, the MN combines the measurement results, and then the MN transmits the measurement report to the TCE. In this case, the method may include steps S601 to S603, and steps S608 and S609.

Step S608: The SN transmits an MDT measurement report to the MN.

The SN performs measurement according to the configuration and transmits the measurement results to the MN according to the configuration of the measurement report. The results may be transmitted to the MN through the user plane or the control plane. For example, for the SN terminated MCG bearer or SN terminated split bearer, the SN is required to perform data delay measurement at higher layers (such as PDCP, and/or NG interface user plane delay). The SN obtains the measurement result of the SN part, and the SN transmits a part of the measurement results to the MN. Alternatively, the SN is required to perform lower layer measurements (such as the RLC/MAC, and/or Xn interface user plane), the SN obtains the measurement results of the SN part, and the SN transmits a part of the measurement results to the MN.

The measurement report transmitted by the SN includes TR, TRSR, measurement name, DRB ID (or mapped 5QI/mapped QFI corresponding to DRB), and measurement results. According to the DRB ID (or the mapped 5QI/mapped QFI corresponding to the DRB), the MN may combine the measurement results to obtain the measurement result of the entire DRB.

Step S609: The MN transmits an MDT report to the TCE.

The MN receives the measurement report transmitted by the SN, and combines the measurement performed on the MN with the measurement transmitted by the SN according to the TR, TRSR, measurement name, and DRB ID (or mapped 5QI/mapped QFI corresponding to the DRB) contained in the measurement report, to obtain an overall measurement of the data radio bearer. The specific combining method is shown above.

According to the configuration of the measurement report, the MN transmits the measurement result to the TCE. The measurement report includes the TR, TRSR, measurement name, DRB ID (or mapped 5QI/mapped QFI corresponding to the DRB), and the measurement result.

It may be understood that, as another optional reporting method, MN may transmits the measurement report obtained by itself to the SN, and SN may combine the measurement report obtained by itself and the measurement report received from the MN and transmit the combined measurement report to TCE for completing the report. The principle of this solution is the same as the principle of step S608 and step S609 above, except that one of the nodes performing the combining process is an MN and another is an SN.

This embodiment also describes another reporting method, that is, performing combination by a certain node of the RAN. In this method, if an MDT measurement is respectively performed on the MN and SN, the entity where the lower layer (RLC/MAC) is located transmits the measurement result to the entity where the higher layer (such as PDCP) is located, and the entity where the higher layer is located combines the measurement results, and then transmits the combined data to TCE. In this case, the method may include steps S611, S612, S613, and S614.

Step S611: The SN transmits an MDT measurement report to the MN.

The SN performs measurement according to the configuration and transmits the measurement results to the MN according to the configuration of the measurement report. The results may be transmitted to the MN through the user plane or the control plane. For example, for the MN terminated split bearer or the MN terminated SCG bearer, the SN is required to perform lower layer measurements (such as the RLC/MAC, and/or Xn interface user plane). The SN obtains the measurement results of the SN part, and the SN transmits a part of the measurement results to MN.

The measurement report transmitted by the SN includes TR, TRSR, measurement name, DRB ID (or mapped 5QI/mapped QFI corresponding to DRB), and measurement results. According to the DRB ID (or the mapped 5QI/mapped QFI corresponding to the DRB), the MN may combine the measurement results to obtain the measurement result of the entire DRB.

Step S612: The MN transmits an MDT measurement report to the SN.

The MN performs measurement according to the configuration, and transmits the measurement result to the SN according to the configuration of the measurement report. The result may be transmitted to the SN through the user plane or the control plane. For example, for the SN terminated MCG bearer or SN terminated split bearer, the MN is required to perform lower layer measurements (such as RLC/MAC, and/or Xn interface user plane), the SN is required to perform higher layer measurements, and the MN obtains the measurement results of the MN part, MN transmits a part of the measurement results to SN, and the results are combined by SN.

The measurement report transmitted by the MN includes TR, TRSR, measurement name, DRB ID (or mapped 5QI/mapped QFI corresponding to DRB), and measurement results. According to the DRB ID (or the mapped 5QI/mapped QFI corresponding to the DRB), the SN may combine the measurement results to obtain the measurement result of entire DRB.

Step S613: The MN transmits an MDT measurement report to the TCE.

The MN receives the measurement report transmitted by the SN. According to the TR, TRSR, measurement name, and DRB ID (or the mapped 5QI/mapped QFI corresponding to the DRB) included in the measurement report, the measurement results are combined to obtain the measurement result of the entire radio bearer. For specific combining methods, please refer to the descriptions in the foregoing.

According to the configuration of the measurement report, the MN transmits the overall measurement result of a certain data radio bearer to the TCE. The measurement report includes TR, TRSR, measurement name, DRB ID (or mapped 5QI/mapped QFI corresponding to the DRB), and the measurement result.

Step S614: The SN transmits an MDT measurement report to the TCE.

*240 The SN receives the measurement report transmitted by the MN. According to the TR, TRSR, measurement name, and DRB ID (or the mapped 5QI/mapped QFI corresponding to the DRB) included in the measurement report, the measurement results are combined to obtain the measurement result of the entire radio bearer. The specific combining method is shown above.

According to the configuration of the measurement report, the SN transmits the overall measurement result of a certain data radio bearer to the TCE. The measurement report includes the TR, TRSR, the measurement name, the DRB ID (or the mapped 5QI/mapped QFI corresponding to the DRB), and the measurement result.

It should also be noted that Embodiment 4 is also described by taking the process of activated signaling-based MDT as an example. In fact, the method of this embodiment is also suitable for activated management-based MDT. The method of reporting MDT measurement is similar.

In addition, according to the foregoing description, it may be known that the MN and the SN may also be base stations with separation architecture, for example, may be a base station including a CU and a DU. When the MN and/or SN is a base station of a separation architecture. In a dual connection mode, for different application scenarios, the nodes that perform MDT measurement and/or combine MDT measurement reports in the MN and/or SN may be different entities in MN and/or SN. For example, as an example, the MN is a base station with a non-separation architecture, and the SN is a base station including a CU and a DU. The MN may receive MDT configuration information from a core network node (such as MME/AMF) and transmit the MDT configuration information to the CU of SN. If the MDT measurement requires both the CU and the DU of the SN to participate (MN may or may not need to participate), the CU of the SN needs to complete the measurement of its own part based on the received MDT configuration information, and transmit the MDT configuration information to the DU, and the DU completes the MDT measurement according to the received configuration information. In this application scenario, the DU and CU of the SN may transmit measurement reports to the MN, and the MN combines multiple measurement reports and transmits them to the TCE; or the DU of the SN transmits its measurement reports to the CU and the CU combines the measurement report transmitted by the DU with the measurement report obtained by itself, and transmit the combined measurement report to the TCE; Of course, if the MN is also involved in MDT measurement, when the MN performs the combining operation, the combined MDT measurement report includes the report measured by the MN itself, when the combination is performed by an entity part of SN, the MN may transmit the measurement report measured by itself to the entity part of the SN, such as CU, and the entity part of the SN will transmit the combined report to TCE after the reports are combined. In addition, for the implementation manner in which both MN and SN perform report combination processing described in the foregoing embodiments, it is also applicable in this scenario. At this time, the processing performed by the SN in the foregoing embodiments may be correspondingly performed by the CU and/or DU part of the SN.

It may be seen from the foregoing description of the technical solution of the present disclosure that the embodiments of the present disclosure provide a method for performing MDT measurement and reporting when the access network includes multiple entities.

Figure 8:
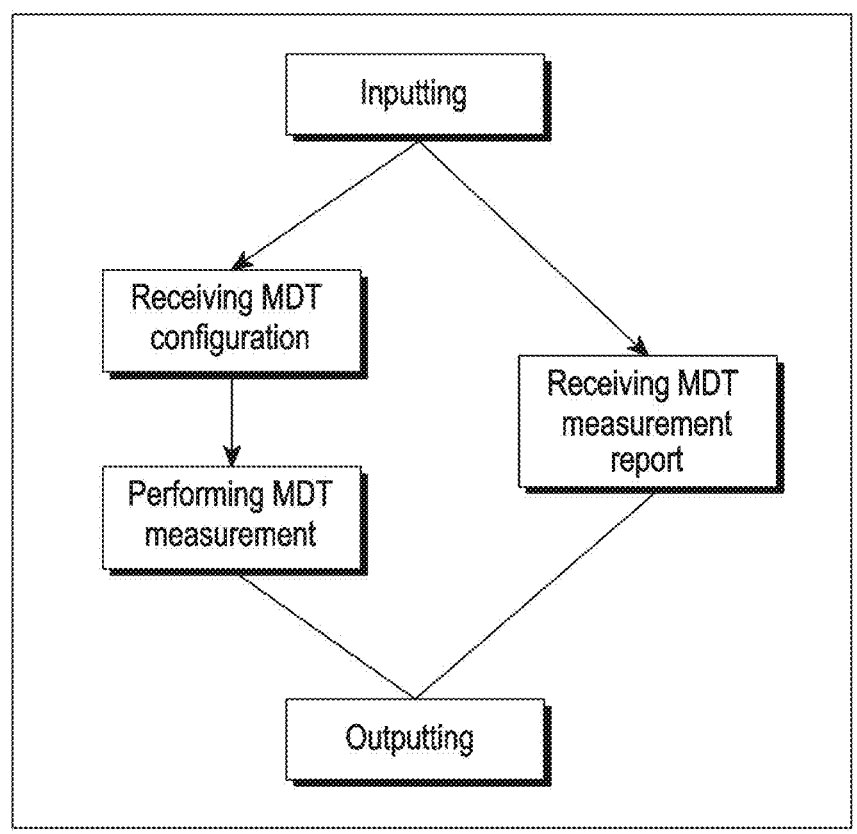
FIG. 8 illustrates a schematic flowchart of an access network node according to an embodiment of the present disclosure.

FIG. 8 schematically illustrates a flowchart of an access network node for performing MDT measurement performing MDT measurement and reporting according to an exemplary embodiment of the present disclosure. As shown in FIG. 8, the access network node may receive the MDT configuration information, the access network node may perform MDT measurement according to the configuration information, and the access network node may also receive the MDT measurement results transmitted by other access network nodes (receiving the MDT measurement report as shown in figure), the access network node integrates the received measurement result with its own measurement result, and forms a measurement result to be transmitted to the MDT central node through the output unit. Of course, it may be known from the foregoing description that different access network nodes may separately transmit the measurement results to the MDT central node, and the central node integrates the received MDT measurement results.

Figure 9:
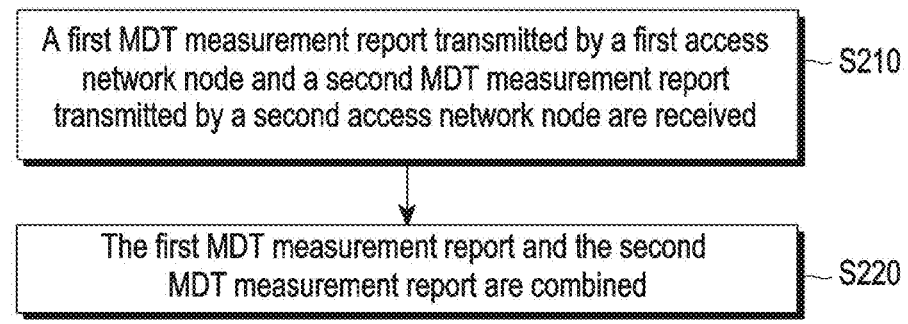
FIG. 9 illustrates a schematic flowchart of a method for reporting MDT measurement according to an embodiment of the present disclosure.

Based on the same principle as the method shown in FIG. 3, FIG. 9 shows a schematic flowchart of a method for reporting an MDT measurement provided by another embodiment of the present disclosure. As shown in the figure, the method may include the following steps.

Step S210: a first MDT measurement report transmitted by a first access network node and a second MDT measurement report transmitted by a second access network node are received.

Step S220: the first MDT measurement report and the second MDT measurement report are combined.

It may be seen from the description of step S210 and step S220 that the method shown in FIG. 9 is a description made from the perspective of a node that performs a combination processing on the MDT measurement report. This method is the same as the principle of the solutions in the embodiments or examples described above, and the execution body of the method may be the node that combines multiple MDT measurement reports in the embodiments or examples described above.

The first access network node or the second access network node may be any node in the access network. Specifically, the first access network node and the second access network node may be any of the following: a primary base station, a secondary base station, CU of base station, DU of base station, CU-CP, CU-UP.

In an optional embodiment of the present disclosure, the method shown in FIG. 9 is performed by a first node, where the first node is a measurement center node, an operation and maintenance node, a CU-CP of a base station, a primary base station, or a secondary base station.

In addition, according to the foregoing description, it may be known that the primary base station and/or the secondary base station may be either a separation architecture base station or a non-separation architecture base station. When the primary base station and/or the secondary base station are separation architecture base stations, such as the primary base station and/or the secondary base station are a base station including a CU and a DU, the first node may specifically be the CU or the DU in the primary base station and/or the secondary base station when the first node is the primary base station or the secondary base station. Similarly, when an access network node is a primary base station or a secondary base station, the access network node may specifically be any entity part of the primary base station or the secondary base station, such as CU or DU of a base station.

When the first node is a CU-CP UP, a primary base station, or a secondary base station, after combining the first MDT measurement report and the second MDT measurement report, the method further includes: transmitting the combined MDT measurement report to a second node, wherein the second node includes a measurement center node or an operation and maintenance node.

In other words, when the first node is not the final destination node that receives the MDT measurement report, after the first node combines the measurement reports, the first node may transmit the combined report to the final destination node, such as an operation and maintenance node or the measurement central node.

In an optional embodiment of the present disclosure, the first MDT measurement report or the second MDT measurement report includes at least one of the following information: identifier of MDT measurement; MDT measurement type indication information; type indication information of node for MDT measurement; bearer type indication information; measurement level indication information; data radio bearer DRB identification indication information; MDT measurement results.

In an optional embodiment of the present disclosure, the DRB identification indication information includes at least one of the following: DRB identifier, at least one QFI mapped to DRB, and QoS parameter information corresponding to at least one QF mapped to DRB.

For a detailed description of the foregoing information that may be contained in the measurement report, refer to the detailed description of the information in the foregoing, which is not repeated here.

In an optional embodiment of the present disclosure, the combining the first MDT measurement report and the second MDT measurement report includes: based on the same or associated information contained in the first MDT measurement report and the second MDT measurement report, combining the first MDT measurement report and the second MDT measurement report.

For specific descriptions of the optional embodiments of the solution shown in FIG. 9, reference may be made to the content description of the corresponding part in the foregoing.

For the dual-connected network architecture, since the UE is configured as dual-connected, in this scenario, if the SN obtains the MDT activation message from the EM of the SN, but the indication information of the UE that allows to perform MDT measurement is obtained from the core network by the MN, it is also an issue to be solved how to configure relevant information for MDT measurement in this application scenario. In view of this problem, an embodiment of the present disclosure further provides a method for configuring MDT measurement. The method is applicable to a dual-connected network architecture. The method is performed by a first access network node, and may include: obtaining information indicating whether the user equipment (UE) allows to perform MDT measurement; receiving MDT configuration information; selecting the UE for performing the MDT measurement based on the information indicating whether the UE allows to perform MDT measurement and the MDT configuration information; transmitting a cell data tracking message to a second access network node so that the second access network node is triggered to transmit a data tracking request message to the core network node.

For this configuration method, optionally, the first access network node may be any of the following: the secondary base station, the central unit (CU) of the secondary base station, and the control plane of the central unit (CU-CP) of the secondary base station.

The second access network node is any one of the followings: the main base station, the CU of the main base station, and the CU-CP of the main base station.

*263 The primary base station may be a base station in LTE, or a base station in 5G system, or a base station in other system, and the secondary base station SN may be a base station in LTE, or a base station in 5G system, or a base station in other system. The interface between the primary base station and the secondary base station may be an X2 interface or an Xn interface. That is, the first access network node in the embodiment of the present disclosure may be a base station of LTE, 5G system, or other system or an entity in the base station, and the second access network node may also be a base station of LTE, 5G system, or other system or an entity in the base station.

Based on the solution provided in the embodiment of the present disclosure, when the first access network node receives the MDT configuration information transmitted by the EM of the node, it may determine the UE performing the MDT measurement based on the MDT configuration information and the obtained indication information of whether the UE is allowed to perform MDT measurement, so that the corresponding MDT configuration information is transmitted directly or through the second access network node to the determined UEs, and these UEs perform MDT measurement according to the received configuration information. In addition, the first access network node also triggers the second access network node to transmit a corresponding data tracking request message to the core network node, so that the core network node transmits related information of the UE that performs MDT measurement to the destination node that receives the MDT measurement report, such as TCE.

Optionally, the above information indicating whether the UE allows to perform MDT measurement includes at least one of the following: information indicating whether to allow the UE to perform management-based MDT measurement; a list of public land mobile network (PLMN) identifiers for which the UE performs management-based MDT measurements.

It is clear to a person skilled in the art that the information indicating whether the UE allows to perform MDT measurement may include, in addition to at least one of the above information, other information specified by the system. The detailed description of each information will be described below in combination with specific embodiments, and will not be described here.

Optionally, the above MDT configuration information includes at least one of the following: identifier of MDT measurements, MDT measurement type indication information, and reporting mechanism for MDT measurement.

Optionally, the cell data tracking message carries the identifier of the MDT measurement, where the identifier of the MDT measurement includes at least one of the following: TR of MDT measurement; TRSR of MDT measurement; the identifier that can uniquely indicate an MDT measurement in the entire network.

The above-mentioned configuration method provided by the embodiment of the present disclosure is further described in detail in combination with a specific embodiment below.

Embodiment 5

Figure 10:
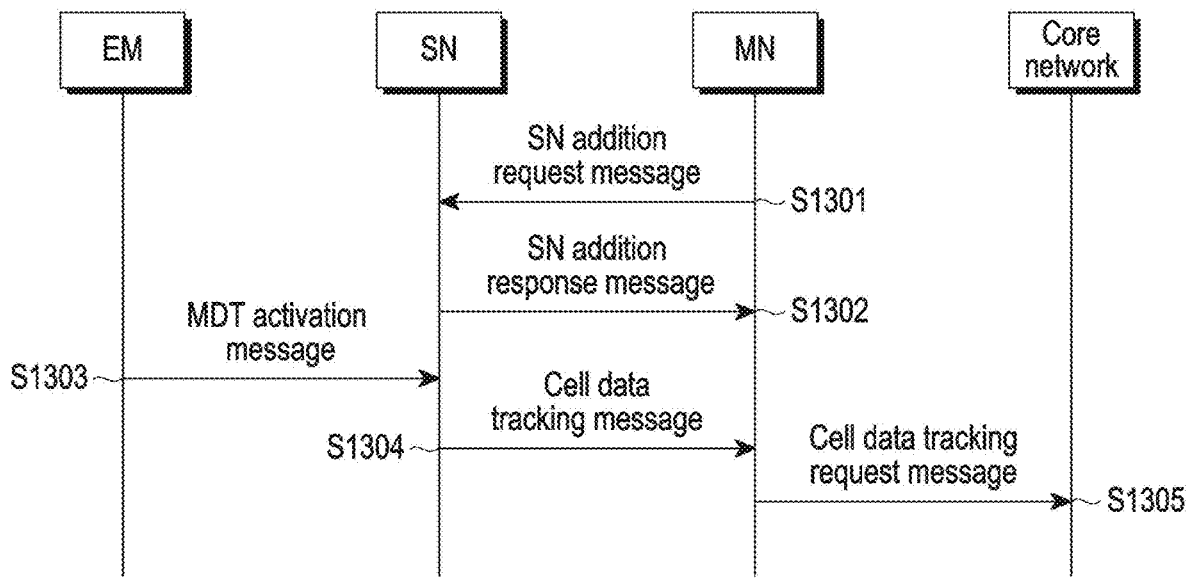
FIG. 10 illustrates a schematic flowchart of a method for configuring MDT measurement according to a fifth embodiment of the present disclosure.

In this embodiment, the first access network node is the secondary base station, i.e., the SN, and the second access network node is the primary base station, i.e., the MN. The example describes the method of configuring MDT between the primary base station and the secondary base station. It may be known from the foregoing description that the MN may be a base station in LTE, or a base station in 5G system, or a base station in other system, and the SN may be a base station in LTE, or a base station in 5G system, or a base station in other system. The interface between the primary base station and the secondary base station may be an X2 interface or an Xn interface. For other systems, it may also be another interface. FIG. 10 shows a schematic flowchart of the configuration method in this embodiment. As shown in the figure, the method may include the following steps.

Step S1301: the MN transmits an SN addition request message to the SN. The message carries information indicating whether the UE allows to perform MDT measurement, and also carries indication information of a serving cell where the UE is located.

The MN obtains the MDT-related information of the user (i.e., the UE) from the core network node (the core network shown in the figure). The MDT-related information includes the information indicating whether to allow the user to perform management-based MDT measurement, and/or, a list of public land mobile network (PLMN) identifiers for which the UE performs management-based MDT measurements. The MN transmits the user's MDT-related information, i.e., information indicating whether to allow the user to perform management-based MDT measurement, and/or a list of PLMN identifiers (hereinafter referred to as MDT PLMN list) that can perform management-based MDT measurement to the SN.

Optionally, the SN addition request message may include one or more of the following information.

The identifier of the UE on the X2 or Xn interface, at least including the identifier on the interface allocated by the MN to the UE.
  The serving PLMN identifier of the UE. The serving PLMN identifier of the UE is the operator identifier selected by the MN or the UE. The MN stores the serving PLMN identifier of the UE and transmits it to the SN.
  The identifier of the cell where the UE is located, for example, it includes the unique cell global identifier (CGI) of the cell where the UE is located, or the physical layer identity (PCI) of the cell where the UE is located and frequency of cell.
  The routing area information where the UE is located, for example, tracking area identity (TAI), or tracking area code/routing area code (TAC).
  Information indicating whether to allow the UE to perform management-based MDT measurement, indicates that the UE is allowed to perform management-based MDT measurement, and the node receiving the information may select the UE to perform management-based MDT measurement.
  A list of MDT PLMNs that can perform MDT measurements. UEs in the system indicated by these PLMN identities in this list can perform MDT measurements.

Step S1302: the SN transmits an SN addition response message to the MN.

Step S1303: the EM of the SN configures the SN to perform management-based MDT measurement, the EM transmits an MDT activation message to the SN, and the MDT activation message includes MDT configuration information. MDT configuration information may include one or more of the following information.

Identifier of the MDT measurement, such as TR, which is a unique identifier across the entire network, including the identifier of the PLMN and an ID, which identifies a certain MDT measurement of the MDT.

IP address of the measurement center node (such as TCE), which is the entity that receives the measurement report.

The mode of measurement, or the type of measurement, or the name of the measurement, which specifically refers to which measurement is performed. For example, the measurement type may be a data delay measurement.

Reporting configuration information, including reporting period, reporting threshold, etc.

Measurement range. The measurement range may be a group of cells, that is, a list of cell identifiers; or a list of routing area identifiers, such as a TAI list or a TAC list, or the entire PLMN range.

Privacy indication information, i.e., anonymous indication information, which indicates whether the core network needs to transmit the UE's IMSI/IMEI/or IMEISV to the TCE node. Specifically, for example, if anonymous, the core network does not transmit the UE's IMSI/IMEI/or IMEISV to the TCE, and may transmit other information of the UE, such as IMEI's type allocation code (IMEI-TAC) to the TCE.

Configuration information of where the measurement result is transmitted, the configuration information indicates to which entity the access network node should transmit the MDT measurement result, that is, the destination node is which node, for example, the measurement result may be configured to be transmitted to another access network entity, for example, MN, or it is transmitted to the MDT central entity (that is, the measurement center node, such as TCE). The configuration information may include, but is not limited to, a destination node identifier of the measurement report, an IP address and/or a tunnel identifier of the destination node of the measurement report, or other information for indicating the destination node.

Whether the measurement result is reported to the MDT central entity configuration, the configuration information indicates whether the access network node reports the measurement result to the MDT central entity TCE, or the configuration information may be indicated by the IP address of the measurement center node (such as TCE).

Step S1304: The SN selects the user, i.e., the UE, for MDT measurement, and then for the selected UE, the SN transmits a cell data tracking message to the MN on the signaling connection of the UE.

When the SN selects the UE for MDT measurement, certain conditions may be met, for example, whether the user agrees to perform the measurement and/or whether the UE is located at the MDT position in the MDT configuration information. If the UE does not agree with the MDT, or the UE does not meet location selection conditions, for example, the serving cell of the UE is not within the MDT range in the MDT configuration information, and the UE cannot be selected as the UE for the MDT. After the UE is selected, if the UE needs to perform measurement, the SN transmits the MDT configuration information to the UE. Specifically, the SN may transmit the configuration information about the UE to the UE through the MN, or directly transmit the configuration information to the UE. The UE performs MDT measurement according to the configuration, and when the reporting condition is met, the measurement result is transmitted to an access network node, such as an SN or MN.

After the SN selects the UE, the SN transmits a cell data tracking message to the MN on the signaling connection of the UE. The cell data tracking message may carry one or more of the following information.

Identifier of the MDT measurement, as described above, the identifier of the MDT measurement may be a TR or a combination of TR and TRSR, or one or more of the identifiers that can uniquely indicate an MDT in the entire network, such as a combination of TR and TRSR.

IP address of the measurement central node (e.g., TCE).

Identifier of the cell, indicating the identifier of the cell in which the UE is located.

Privacy indication information, which is also anonymous indication information, indicates whether the core network needs to transmit the UE's IMSI/IMEI to the TCE node. Specifically, if anonymous, the core network does not transmit the UE's IMSI to the TCE and may transmit IMEI-TAC to the TCE. The anonymous indication information can also carry the MDT measurement type, such as indicating whether the measurement type is immediate measurement (immediate MDT) or recorded measurement (logged MDT). According to different measurement types, the core network can perform different operations, such as transmitting different UE identities to the TCE.

Step S1305: The MN transmits a cell tracking request message to the core network.

After the MN receives the UE-specific message transmitted by the SN, i.e., the above-mentioned cell data tracking message, the MN transmits a cell tracking request message to the core network on the signaling connection of the UE. The core network may be an MME of LTE, or an AMF of 5G, or a core network node of another system. The content of the cell tracking request message is as shown in the information contained in the cell data tracking message in step S1304, and may be one or more of the foregoing information. After the core network node receives the message transmitted by the MN, the core network node may transmit a message to the MDT server (i.e., the receiving node of the measurement report, such as TCE). The message transmitted by the core network node includes the identifier of the MDT measurement and the identifier of the UE, and so on. After that, the access network node transmits an MDT report to the TCE. The MDT report includes the identifier of the MDT measurement, the receiving node of the measurement report, such as TCE, and it may know which UE the MDT measurement report is directed to according to the identifier of the UE and the identifier of the MDT measurement transmitted by the core network node.

Figure 11:
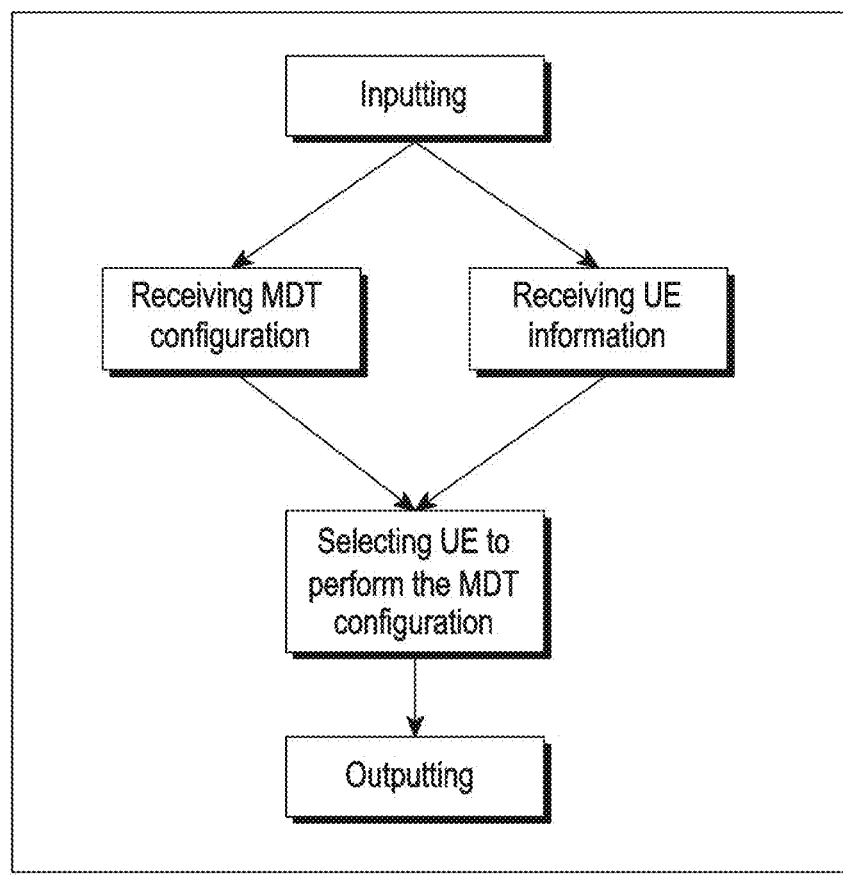
FIG. 11 illustrates a schematic diagram of a workflow of an access network node based on a configuration method according to an embodiment of the present disclosure.

FIG. 11 schematically illustrates a workflow of an access network node for performing a configuration method of MDT measurement provided by an embodiment of the present disclosure. As shown in FIG. 11, the access network node may receive a configuration information of the MDT (MDT configuration shown in the figure), and receive indication information of the UE allowed to perform MDT measurement (receiving UE information shown in the figure), and then determine the UE performing MDT measurement based on the received MDT configuration information and the UE's indication information (which is the step of selecting the UE for MDT configuration shown in the figure), and transmit the MDT configuration information directly or indirectly to these UEs.

Figure 12:
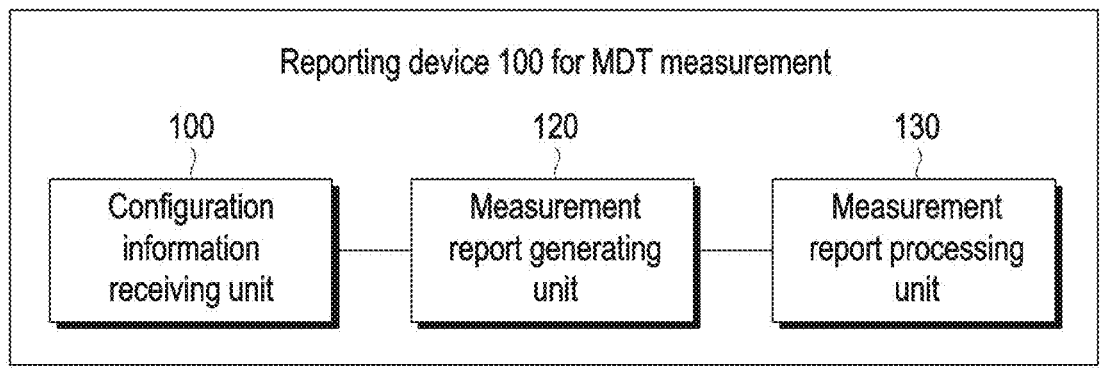
FIG. 12 illustrates a schematic structural diagram of a device for reporting MDT measurement according to an embodiment of the present disclosure.

Corresponding to the method shown in FIG. 3, an embodiment of the present disclosure further provides a device for reporting MDT measurement. As shown in FIG. 12, the device 100 for reporting MDT measurement may specifically include a configuration information receiving unit 110 and a measurement report generating unit 120 and a measurement report processing unit 130.

The configuration information receiving unit 110 is configured to obtain first MDT configuration information.

The measurement report generating unit 120 is configured to perform MDT measurement according to the first MDT configuration information to obtain a first MDT measurement report;

The measurement report processing unit 130 is configured to transmit the first MDT measurement report to a first node, so that the first node combines a second MDT measurement report associated with the first MDT measurement report obtained by the first node with the first MDT measurement report; and/or receive a third MDT measurement report associated with the first MDT measurement report transmitted by a second access network node, combine the third MDT measurement report and the first MDT measurement report, and transmit the combined measurement report to a second node.

The device 100 for reporting MDT measurement may be specifically implemented as any access network node, i.e., an access network entity, that is, the device may specifically be an access network device.

Optionally, the device 100 for reporting MDT measurement is a first access network node, and the first access network node may be any one of the following: a primary base station, a secondary base station, CU of a base station, DU of a base station, CU-CP, CU-UP.

The first node may be any of the following: a measurement center node, an operation and maintenance node, a primary base station, a secondary base station, CU, DU, CU-CP, CU-UP.

The second access network node may be any of the following: a primary base station, a secondary base station, CU, DU, CU-CP, CU-UP.

The second node is a measurement center node or an operation and maintenance node.

Optionally, the first MDT measurement report, the second MDT measurement report, or the third MDT measurement report includes at least one of the following information: identifier of MDT measurements; MDT measurement type indication information; type indication information of a node for performing the MDT measurement; bearer type indication information; measurement level indication information; identification indication information of data radio bearer (DRB); MDT measurement results.

Optionally, the DRB identification information includes at least one of the following: DRB identifier, at least one quality of service flow identifier (QFI) mapped to DRB, and quality of service (QoS) parameter information corresponding to at least one quality of service flow (QF) mapped to DRB.

Optionally, when the measurement report processing unit combines the third MDT measurement report with the first MDT measurement report, it may be specifically used to combine the third MDT measurement report and the first MDT measurement report based on the same or related information contained in the third MDT measurement report and the first MDT measurement report.

Optionally, the configuration information receiving unit is specifically configured to perform any of the following: receiving the first MDT configuration information transmitted by the operation and maintenance node; receiving first MDT configuration information transmitted by a core network node; receiving first MDT configuration information transmitted by a third access network node.

Optionally, if the first MDT configuration information is received from an operation and maintenance node or a core network node, the device may further include a configuration information transmitting unit configured to transmit the third MDT configuration information to a fourth access network node.

Figure 13:
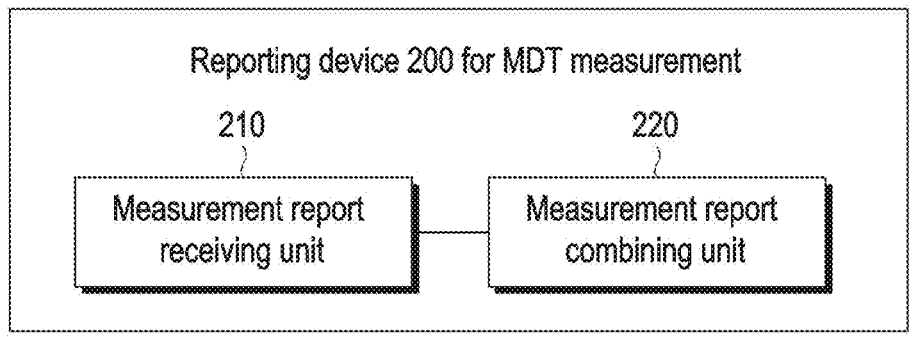
FIG. 13 illustrates a schematic structural diagram of another device for reporting MDT measurement according to an embodiment of the present disclosure.

Corresponding to the method shown in FIG. 9, an embodiment of the present disclosure further provides a device for reporting MDT measurement. As shown in FIG. 13, the device 200 for reporting MDT measurement may include a measurement report receiving unit 210 and a measurement report combining unit 220.

The measurement report receiving unit 210 is configured to receive a first MDT measurement report transmitted by a first access network node and a second MDT measurement report transmitted by a second access network node;

The measurement report combining unit 220 is configured to combine the first MDT measurement report and the second MDT measurement report.

Optionally, the device may specifically be a first node, wherein the first node may be a measurement center node, an operation and maintenance node, a CU-CP of a base station, a primary base station, or a secondary base station.

Optionally, when the first node is a CU-CP, CU-UP, a primary base station, or a secondary base station, the apparatus may further include a measurement report transmitting unit configured to transmit the combined MDT measurement report to a second node, wherein the second node includes a measurement center node or an operation and maintenance node.

Optionally, the first MDT measurement report or the second MDT measurement report includes at least one of the following information: identifier of MDT measurements; MDT measurement type indication information; type indication information of a node for performing the MDT measurement; bearer type indication information; measurement level indication information; identification indication information of data radio bearer (DRB); MDT measurement results.

Optionally, the DRB identification information includes at least one of the following: DRB identifier, at least one QFI mapped to DRB, and QoS parameter information corresponding to at least one QF mapped to DRB.

Optionally, the measurement report combining unit may be configured to combine the first MDT measurement report and the second MDT measurement report based on the same or related information contained in the first MDT measurement report and the second MDT measurement report.

Corresponding to the method for configuring MDT measurement provided in the embodiment of the present disclosure, the embodiment of the present disclosure further provides a device for configuring MDT measurement. The device may specifically include a UE information receiving unit, a configuration information unit, and an information processing unit.

The UE information receiving unit is configured to obtain information indicating whether the UE allows to perform MDT measurement;

The configuration information receiving unit is configured to obtain MDT configuration information;

The information processing unit is configured to select the UE for performing the MDT measurement based on the information indicating whether the UE allows to perform MDT measurement and the MDT configuration information; and transmit a cell data tracking message to a second access network node so that the second access network node is triggered to transmit a data tracking request message to the core network node.

The device in the embodiment of the present disclosure may be specifically included in the first access network node, that is, the device may be a device in the first access network node.

Optionally, the first access network node may be any one of the following: a secondary base station, a CU of the secondary base station, a CU-CP of the secondary base station.

The second access network node may be any one of the following: a primary base station, a CU of the primary base station, and a CU-CP of the primary base station.

Optionally, the foregoing information indicating whether the UE allows to perform MDT measurement may include at least one of the following: information indicating whether to allow the UE to perform management-based MDT measurement; a list of PLMN identifiers that the UE can perform management-based MDT measurements;

Optionally, the above MDT configuration information may include at least one of the following: MDT measurement identifier, MDT measurement type indication information, and reporting mechanism for MDT measurement.

Optionally, the cell data tracking message carries the identifier of the MDT measurement, where the identifier of the MDT measurement includes at least one of the following: TR of MDT measurement; TRSR of MDT measurement; the identifier that can uniquely indicate an MDT measurement in the entire network.

It should be noted that since the device provided in the embodiment of the present disclosure is a device that can perform the method in the embodiment of the present disclosure. Based on the method provided in the embodiment of the present disclosure, those skilled in the art can understand the specific implementations of the device and its various variations of the embodiment of the present disclosure, so it is not described how the device implements the method in the embodiment of the present disclosure in detail here. Any device used by a person skilled in the art to implement the method in the embodiment of the present disclosure falls within the protection scope of the present disclosure.

Based on the same principle as the method provided in the embodiment of the present disclosure, the embodiment of the present disclosure further provides an electronic device, which includes a processor and a memory; wherein the memory stores machine-readable instructions; the processor is used for executing machine-readable instructions to implement the method provided by any embodiment of the present disclosure.

It may be understood that the electronic device may specifically be an access network node, a measurement center node, or an operation and maintenance node.

Another embodiment of the present disclosure provides a computer-readable storage medium. A computer program is stored on the readable storage medium. When the computer program is executed by a processor, it causes the processor to implement the method provided by any embodiment of the present disclosure.

Figure 14:
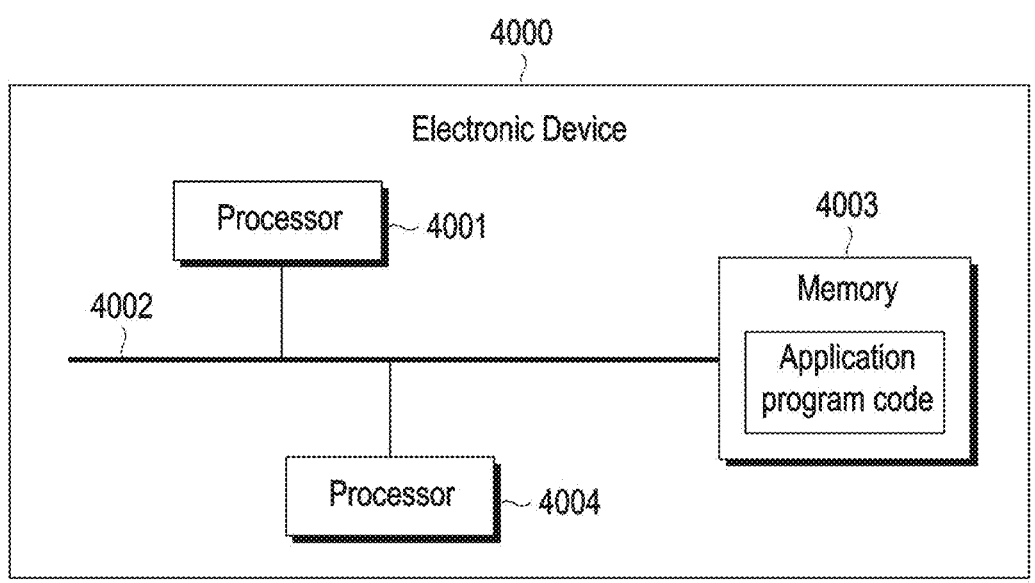
FIG. 14 illustrates a schematic structural diagram of an electronic device according to an embodiment of the present disclosure.

FIG. 14 shows a schematic structural diagram of an electronic device applicable to the solution provided by the embodiment of the present disclosure. As shown in FIG. 14, the electronic device 4000 shown in FIG. 14 includes a processor 4001 and a memory 4003. The processor 4001 and the memory 4003 are connected, for example, through a bus 4002. Optionally, the electronic device 4000 may further include a transceiver 4004. It should be noted that, in practical applications, the number of transceivers 4004 is not limited to one, and the structure of the electronic device 4000 does not limit the embodiments of the present disclosure.

The processor 4001 may be a central processing unit (CPU), a general-purpose processor, a data signal processor (DSP), an application specific integrated circuit (ASIC), or a field programmable gate array (FPGA), or other programmable logic devices, transistor logic devices, hardware components or any combination thereof. It may implement or execute various exemplary logical blocks, units, and circuits described in connection with the disclosure of this application. The processor 4001 may also be a combination that realizes a computing function, for example, a combination including one or more microprocessors, a combination of a DSP and a microprocessor, and the like.

The bus 4002 may include a path for transmitting information between the aforementioned components. The bus 4002 may be a peripheral component interconnect (PCI) bus or an extended industry standard architecture (EISA) bus, or the like. The bus 4002 may be divided into an address bus, a data bus, a control bus, and the like. For ease of illustration, only one thick line is used in FIG. 14, but it does not mean that there is only one bus or one type of bus.

The memory 4003 may be a read-only memory (ROM) or other type of static storage device that can store static information and instructions, a random access memory (RAM), or other type of information that can store information and instructions Dynamic storage device, which can also be electrically erasable programmable read only memory (EEPROM), compact disc read only memory (CD-ROM) or other optical disk storage, optical disk storage (including compression optical discs, laser discs, optical discs, digital versatile discs, blu-ray discs, etc.), disk storage media or other magnetic storage devices, or may be used to carry or store desired program code in the form of instructions or data structures and may be any other medium accessed by a computer, but not limited to this.

The memory 4003 is configured to store application program code for executing the solution of the present disclosure, and the processor 4001 controls execution. The processor 4001 is configured to execute application program code stored in the memory 4003 to implement the content shown in any one of the foregoing method embodiments.

It should be understood although the each of steps in the flowchart of the drawings are sequentially shown as the arrows, these steps are not necessarily performed in the order indicated by the arrows. Unless otherwise expressly stated herein, the implementation of these steps is not strictly limited in the order, and they may be performed in other orders. Moreover, at least some of the steps in the flowchart of the drawings may include a plurality of sub-steps or stages, and the plurality of sub-steps or stages are not necessarily performed at the same time, but may be performed at different times, and the plurality of sub-steps or stage are not necessary to be performed sequentially, but may be performed alternately with at least a portion of other steps or sub-steps or stages of other steps.

The above descriptions are only a portion of the embodiments of the present disclosure, and it should be noted that those skilled in the art can make several improvements and modifications without departing from the principles of the present disclosure. These improvements and modifications should be considered to fall with the scope of protection of the present disclosure.

The invention claimed is:

1. A method for reporting minimization of drive tests (MDT) measurements, which is performed by a first access network node, the method comprising:
obtaining first MDT configuration information, wherein the first MDT configuration information includes a measurement range indicating a group of cells, privacy indication information, and configuration information of where a measurement result is transmitted;
performing MDT measurement according to the first MDT configuration information to obtain a first MDT measurement report, wherein the first MDT measurement report comprises bearer type indication information for specifying a bearer to be used on a specific session; and
transmitting the first MDT measurement report to a first node, so that the first node combines a second MDT measurement report associated with the first MDT measurement report obtained by the first node with the first MDT measurement report.

2. The method according to claim 1, further comprising:
receiving a third MDT measurement report transmitted by a second access network node;
combining the third MDT measurement report and the first MDT measurement report; and
transmitting the combined measurement report to a second node.

3. The method according to claim 2, wherein the first access network node is any one of the followings:
a primary base station, a secondary base station, a central unit (CU) of a base station, a distribute unit (DU) of the base station, a control plane of the CU (CU-CP), and a user plane of the CU (CU-UP),
wherein the first node is any one of the followings:
a measurement center node, an operation and maintenance node, the primary base station, the secondary base station, the CU, the DU, the CU-CP, and the CU-UP,
wherein the second access network node is any one of the followings:
the primary base station, the secondary base station, the CU, the DU, the CU-CP, and the CU-UP, and
wherein the second node is the measurement center node or the operation and maintenance node.

4. The method according to claim 3, wherein each of the first MDT measurement report, the second MDT measurement report, or the third MDT measurement report comprises at least one of the following information:
identifier of MDT measurements;
MDT measurement type indication information;
type indication information of a node for performing the MDT measurement;
measurement level indication information;
identification indication information of data radio bearer (DRB); and
MDT measurement results.

5. The method according to claim 1, wherein the bearer type indication information is set to one of master node (MN) terminated bearer, secondary node (SN) terminated bearer, MN terminated secondary cell group (SCG) bearer, MN terminated split bearer, SN terminated SCG bearer, SN terminated master cell group (MCG) bearer, or SN terminated split bearer.

6. A method for reporting minimization of drive tests (MDT) measurements, the method comprising:
receiving a first MDT measurement report transmitted by a first access network node;
receiving a second MDT measurement report transmitted by a second access network node; and
combining the first MDT measurement report and the second MDT measurement report,
wherein each of the first MDT measurement report and the second MDT measurement report is obtained based on MDT configuration information, and the MDT configuration information includes a measurement range indicating a group of cells, privacy indication information, and configuration information of where a measurement result is transmitted, and
wherein each of the first MDT measurement report and the second MDT measurement report comprises bearer type indication information for specifying a bearer to be used on a specific session.

7. The method according to claim 6,
wherein the method is performed by a first node, the first node is a measurement center node, an operation and maintenance node, and a control plane of a central unit (CU-CP) of a base station, a primary base station or a secondary base station, and
wherein, when the first node is the CU-CP, the primary base station, or the secondary base station, after combining the first MDT measurement report and the second MDT measurement report, the method further comprises:
transmitting the combined MDT measurement report to a second node, and the second node comprises the measurement center node or the operation and maintenance node.

8. The method according to claim 6, wherein the bearer type indication information is set to one of master node (MN) terminated bearer, secondary node (SN) terminated bearer, MN terminated secondary cell group (SCG) bearer, MN terminated split bearer, SN terminated SCG bearer, SN terminated master cell group (MCG) bearer, or SN terminated split bearer.

9. A method for configuring minimization of drive tests (MDT) measurements, which is performed by a first access network node, the method comprising:
obtaining information indicating whether a user equipment (UE) allows to perform MDT measurement;
receiving MDT configuration information, wherein the MDT configuration information includes a measurement range indicating a group of cells, privacy indication information, and configuration information of where a measurement result is transmitted;
selecting the UE for performing the MDT measurement based on the information indicating whether the UE allows to perform MDT measurement and the MDT configuration information;
transmitting a cell data tracking message to a second access network node so that the second access network node is triggered to transmit a data tracking request message to a core network node; and
performing MDT measurement according to the MDT configuration information to obtain a first MDT measurement report comprising bearer type indication information for specifying a bearer to be used on a specific session.

10. The method according to claim 9,
wherein the first access network node is any one of the followings:
a secondary base station, a central unit (CU) of the secondary base station, and a control plane of the central unit (CU-CP) of the secondary base station, wherein the second access network node is any one of the followings:
the primary base station, the CU of the primary base station, and the CU-CP of the primary base station, and
wherein the information indicating whether the UE allows to perform MDT measurement comprises at least one of the followings:
information indicating whether to allow the UE to perform management-based MDT measurement; and
a list of public land mobile network (PLMN) identifiers for which the UE performs management-based MDT measurements.

11. The method according to claim 9, wherein the bearer type indication information is set to one of master node (MN) terminated bearer, secondary node (SN) terminated bearer, MN terminated secondary cell group (SCG) bearer, MN terminated split bearer, SN terminated SCG bearer, SN terminated master cell group (MCG) bearer, or SN terminated split bearer.

12. A configuration device for minimization of drive tests (MDT) measurements, which is included in a first access network node, the configuration device comprising:
a UE information receiving unit, configured to obtain information indicating that a user equipment (UE) allows to perform MDT measurement;
a configuration information receiving unit, configured to obtain MDT configuration information, wherein the MDT configuration information includes a measurement range indicating a group of cells, privacy indication information, and configuration information of where a measurement result is transmitted; and
an information processing unit, configured to:
select the UE for performing the MDT measurement based on the information indicating whether the UE allows to perform MDT measurement and the MDT configuration information, and
transmit a cell data tracking message to a second access network node so that the second access network node is triggered to transmit a data tracking request message to a core network node,
wherein the configuration device is configured to perform MDT measurement according to the MDT configuration information to obtain a first MDT measurement report comprising bearer type indication information for specifying a bearer to be used on a specific session.

13. The configuration device according to claim 12,
wherein the first access network node is any one of the followings:
a secondary base station, a central unit (CU) of the secondary base station, and a control plane of the central unit (CU-CP) of the secondary base station,
wherein the second access network node is any one of the followings:
the primary base station, the CU of the primary base station, and the CU-CP of the primary base station, and
wherein the information indicating whether the UE allows to perform MDT measurement comprises at least one of the followings:
information indicating whether to allow the UE to perform management-based MDT measurement; and
a list of public land mobile network (PLMN) identifiers for which the UE performs management-based MDT measurements.

14. The configuration device according to claim 12, wherein the bearer type indication information is set to one of master node (MN) terminated bearer, secondary node (SN) terminated bearer, MN terminated secondary cell group (SCG) bearer, MN terminated split bearer, SN terminated SCG bearer, SN terminated master cell group (MCG) bearer, or SN terminated split bearer.

15. A device for reporting minimization of drive tests (MDT) measurements, the device comprising:
a configuration information receiving unit, configured to obtain first MDT configuration information, wherein the first MDT configuration information includes a measurement range indicating a group of cells, privacy indication information, and configuration information of where a measurement result is transmitted;
a measurement report generating unit, configured to perform MDT measurement according to the first MDT configuration information to obtain a first MDT measurement report, wherein the first MDT measurement report comprises bearer type indication information for specifying a bearer to be used on a specific session; and
a measurement report processing unit, configured to transmit the first MDT measurement report to a first node, so that the first node combines a second MDT measurement report associated with the first MDT measurement report obtained by the first node with the first MDT measurement report.

16. The device according to claim 15, wherein the measurement report processing unit is further configured to:
receive a third MDT measurement report associated with the first MDT measurement report transmitted by a second access network node,
combine the third MDT measurement report and the first MDT measurement report, and
transmit the combined measurement report to a second node.

17. The device according to claim 16,
wherein the device is any one of the followings:
a primary base station, a secondary base station, a central unit (CU) of a base station, a distribute unit (DU) of the base station, a control plane of the CU (CU-CP), and a user plane of the CU (CU-UP),
wherein the first node is any one of the followings:
a measurement center node, an operation and maintenance node, the primary base station, the secondary base station, the CU, the DU, the CU-CP, and the CU-UP,
wherein the second access network node is any one of the followings:
the primary base station, the secondary base station, the CU, the DU, the CU-CP, and the CU-UP, and
wherein the second node is the measurement center node or the operation and maintenance node.

18. The device according to claim 17, wherein each of the first MDT measurement report, the second MDT measurement report, or the third MDT measurement report comprises at least one of the following information:
identifier of MDT measurements;
MDT measurement type indication information;
type indication information of a node for performing the MDT measurement;
measurement level indication information;
identification indication information of data radio bearer (DRB); and
MDT measurement results.

19. The device according to claim 15, wherein the bearer type indication information is set to one of master node (MN) terminated bearer, secondary node (SN) terminated bearer, MN terminated secondary cell group (SCG) bearer, MN terminated split bearer, SN terminated SCG bearer, SN terminated master cell group (MCG) bearer, or SN terminated split bearer.

20. A device for reporting minimization of drive tests (MDT) measurements, the device comprising:
- a measurement report receiving unit configured to receive a first MDT measurement report transmitted by a first access network node and a second MDT measurement report transmitted by a second access network node; and
- a measurement report combining unit configured to combine the first MDT measurement report and the second MDT measurement report,
- wherein each of the first MDT measurement report and the second MDT measurement report is obtained based on MDT configuration information, and the MDT configuration information includes a measurement range indicating a group of cells, privacy indication information, and configuration information of where a measurement result is transmitted, and
- wherein each of the first MDT measurement report and the second MDT measurement report comprises bearer type indication information for specifying a bearer to be used on a specific session.

21. The device according to claim 20,
- wherein the device is a measurement center node, an operation and maintenance node, and a control plane of a central unit (CU-CP) of a base station, a primary base station or a secondary base station,
- wherein, when the device is the CU-CP, the primary base station, or the secondary base station, after combining the first MDT measurement report and the second MDT measurement report, the measurement report combining unit is further configured to transmit the combined MDT measurement report to a second device, and
- wherein the second device comprises the measurement center node or the operation and maintenance node.

22. The device according to claim 20, wherein the bearer type indication information is set to one of master node (MN) terminated bearer, secondary node (SN) terminated bearer, MN terminated secondary cell group (SCG) bearer, MN terminated split bearer, SN terminated SCG bearer, SN terminated master cell group (MCG) bearer, or SN terminated split bearer.

* * * * *